United States Patent
Kobayashi et al.

(10) Patent No.: US 11,305,399 B2
(45) Date of Patent: Apr. 19, 2022

(54) JIG FOR A POLISHING APPARATUS

(71) Applicant: EBARA CORPORATION, Tokyo (JP)

(72) Inventors: Kenichi Kobayashi, Tokyo (JP); Asagi Matsugu, Tokyo (JP); Makoto Kashiwagi, Tokyo (JP); Manao Hoshina, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 292 days.

(21) Appl. No.: 16/530,175

(22) Filed: Aug. 2, 2019

(65) Prior Publication Data

US 2020/0039025 A1 Feb. 6, 2020

(30) Foreign Application Priority Data

Aug. 2, 2018 (JP) .............................. JP2018-146100

(51) Int. Cl.
| | | |
|---|---|---|
| *B24B 37/34* | (2012.01) | |
| *B25B 11/02* | (2006.01) | |
| *B23P 19/10* | (2006.01) | |
| *B24B 37/32* | (2012.01) | |

(52) U.S. Cl.
CPC .............. *B24B 37/32* (2013.01); *B23P 19/10* (2013.01); *B24B 37/34* (2013.01); *B25B 11/02* (2013.01); *Y10T 29/53961* (2015.01)

(58) Field of Classification Search
CPC ......... B24B 37/27; B24B 37/30; B24B 37/32; B24B 37/34; B25B 11/02; B23P 19/04; B23P 19/10; B23P 19/12; H01L 21/68; H01L 21/687; H01L 21/68714; H01L 21/68721; Y10T 29/53961; Y10T 29/53978; Y10T 29/53983; Y10T 29/54; B23Q 3/18; B23Q 3/183; B23Q 3/186; Y10S 414/135
USPC ......................................................... 29/281.1
See application file for complete search history.

(56) References Cited

U.S. PATENT DOCUMENTS

| | | | | | |
|---|---|---|---|---|---|
| 5,993,302 | A | * | 11/1999 | Chen ....................... | B24B 37/32 451/285 |
| 6,093,086 | A | * | 7/2000 | Easter ...................... | B24B 37/11 251/288 |
| 7,134,948 | B2 | * | 11/2006 | Tseng ...................... | B24B 37/32 451/288 |
| 7,354,335 | B2 | * | 4/2008 | Marquardt ............... | B23Q 3/18 451/11 |

(Continued)

FOREIGN PATENT DOCUMENTS

| | | | | | |
|---|---|---|---|---|---|
| CN | 101349616 A | * | 1/2009 | ......... | B24B 37/0053 |
| JP | 2006-255851 A | | 9/2006 | | |

(Continued)

*Primary Examiner* — Joseph J Hail
*Assistant Examiner* — Jonathan R Zaworski
(74) *Attorney, Agent, or Firm* — BakerHostetler

(57) ABSTRACT

Provided is a jig for assisting the dismounting and mounting of a top ring.
One embodiment provides a jig for mounting/dismounting at least a part of the top ring for holding a substrate. The jig comprises a movable plate for supporting at least a part of the top ring, which is in a dismounted state, a plurality of posts for positioning the jig at a predetermined position relative to the top ring, the plurality of posts being configured to be engaged with the top ring, and a drive mechanism for moving the movable plate in a direction toward and away from the top ring.

12 Claims, 22 Drawing Sheets

(56) References Cited

U.S. PATENT DOCUMENTS

| | | | | |
|---|---|---|---|---|
| 7,530,153 | B2 * | 5/2009 | Doan | B24B 37/32 |
| | | | | 29/407.01 |
| 9,908,212 | B2 * | 3/2018 | Suemasa | B24B 37/34 |
| 10,092,992 | B2 * | 10/2018 | Yasuda | B24B 37/20 |
| 2005/0009456 | A1 * | 1/2005 | Sasaki | B24B 37/245 |
| | | | | 451/287 |
| 2008/0085658 | A1 | 4/2008 | Katsuoka et al. | |
| 2009/0111362 | A1 | 4/2009 | Nabeya et al. | |
| 2019/0176291 | A1 * | 6/2019 | Yang | H01L 21/68764 |

FOREIGN PATENT DOCUMENTS

| | | | | |
|---|---|---|---|---|
| JP | 3980746 | B2 * | 9/2007 | |
| JP | 2008-110471 | A | 5/2008 | |
| JP | 2009-131946 | A | 6/2009 | |
| JP | 2018022800 | A * | 2/2018 | B24B 37/0053 |
| KR | 20010001958 | A * | 1/2001 | |
| KR | 20060077510 | A * | 7/2006 | |
| KR | 101206778 | B1 * | 11/2012 | |
| KR | 200469098 | Y1 * | 9/2013 | |
| WO | WO-03064734 | A1 * | 8/2003 | C25F 7/00 |

* cited by examiner

JIG FOR A POLISHING APPARATUS

CROSS-REFERENCE TO RELATED APPLICATION

This application is based upon and claims the benefit of priority of the prior Japanese Patent Application No. 2018-146100, filed on Aug. 2, 2018, the entire contents of which are incorporated herein by reference.

TECHNICAL FIELD

The present patent application relates to a jig for a polishing apparatus.

BACKGROUND ART

Chemical mechanical polishing (CMP) devices are used to planarize substrate surfaces in manufacturing semiconductive devices. The substrates used in manufacturing the semiconductive devices usually have a circular disc-like shape. There has been a growing demand for greater flatness in planarization of the surfaces of not only the substrate used to manufacture semiconductive devices but also quadrangular substrates, such as CCL substrates (Copper Clad Laminate substrates), PCB (Printed Circuit Board) substrates, photomask substrates, and display panels. There also has been a growing demand for planarization of the surfaces of package substrates, such as PCB substrates, in which electronic devices are arranged.

CITATION LIST

Patent Literature

PTL 1: Japanese Unexamined Patent Application Publication (Kokai) No. 2008-110471
PTL 2: Japanese Unexamined Patent Application Publication (Kokai) No. 2006-255851
PTL 3: Japanese Unexamined Patent Application Publication (Kokai) No. 2009-131946

SUMMARY OF INVENTION

Technical Problem

There has recently been a tendency to manufacture larger substrates in view of efficiency in the manufacture of devices. As to a CMP device, a top ring for holding a substrate has been increased in size and weight along with the increasing dimensions of substrates. In some cases, a part or the whole of the top ring for holding a substrate is dismounted when the CMP device receives maintenance. The increasing dimensions and weight of the top ring makes difficult the dismounting and mounting of the top ring. An object of the present patent application is to provide a jig for assisting the dismounting and mounting of a top ring.

Solution to Problem

One embodiment provides a jig for mounting/dismounting at least a part of a top ring for holding a substrate. The jig comprises a movable plate for supporting at least a part of the top ring, which is in a dismounted state, a plurality of posts for positioning the jig at a predetermined position relative to the top ring, the plurality of posts being configured to be engaged with the top ring, and a drive mechanism for moving the movable plate in a direction toward and away from the top ring.

DESCRIPTION OF EMBODIMENTS

The following description discusses embodiments of a polishing apparatus and a jig used in the polishing apparatus according to the present invention with reference to the attached drawings. In the attached drawings, identical or similar elements are provided with respective identical or similar reference marks. In the embodiments, explanations overlapping between the identical or similar elements might be omitted. Features mentioned in each embodiment are applicable to the other embodiments as long as there is no inconsistency.

Figure 1:
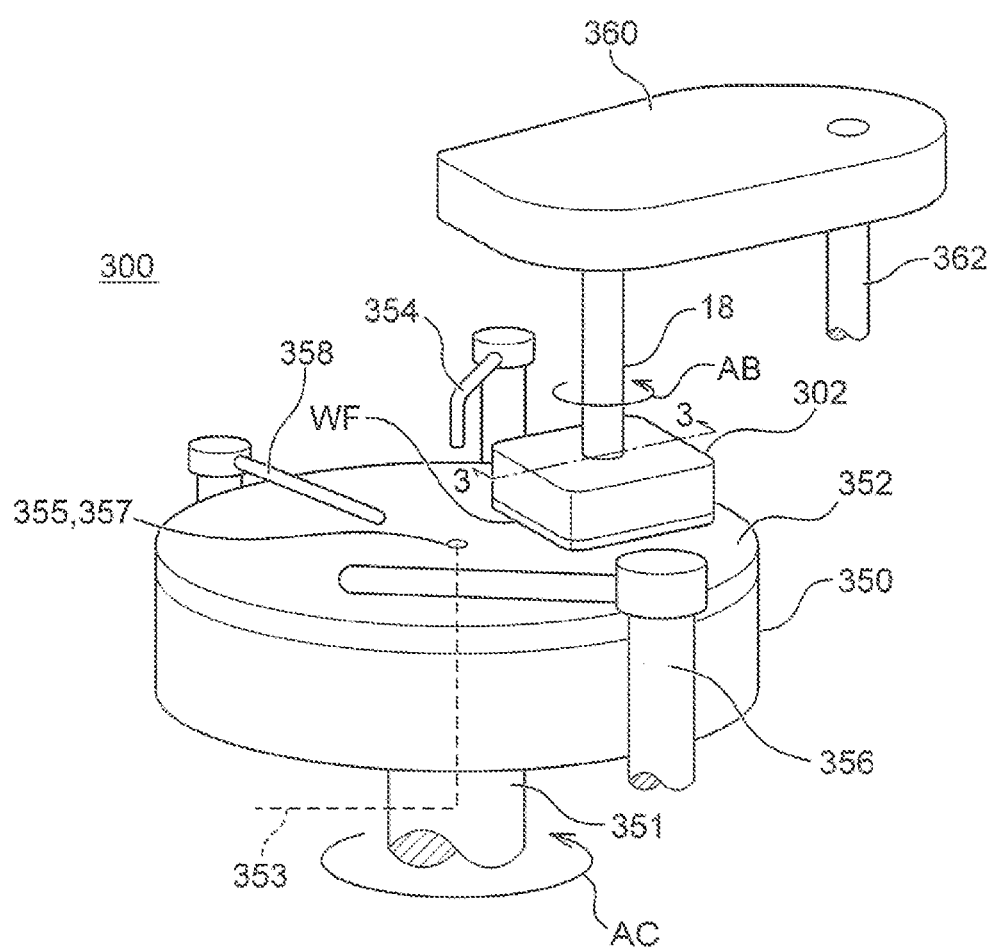
FIG. 1 is a schematic perspective view of a polishing apparatus according to one embodiment.

FIG. 1 is a schematic perspective view of a polishing apparatus 300 according to one embodiment. As shown in FIG. 1, the polishing apparatus 300 comprises a polishing table 350 and a top ring 302. The polishing table 350 is rotationally driven by a drive source, not shown. Attached to the polishing table 350 is a polishing pad 352. According to one embodiment, the polishing pad 352 may be attached to polishing table 350 with a layer intervening therebetween. The layer is intended to facilitate the detachment of the polishing pad 352 from the polishing table 350. The layer is, for example, a silicone layer, a fluorine-based resin layer or the like. It is also possible to use, for example, the layer disclosed in the Japanese Unexamined Patent Application Publication (Kokai) No. 2014-176950. The top ring 302 holds and presses a substrate WF against the polishing pad 352. The top ring 302 is rotationally driven by a drive source, not shown. The substrate WF is held and pressed against the polishing pad 352 by the top ring 302 to be polished.

According to one embodiment, a groove is formed in a surface of the polishing pad 352. The groove is intended to control a flow of polishing liquid which is fed onto the surface of the polishing pad 352. The groove may be formed in any size, depth, sectional shape, and pattern.

As shown in FIG. 1, the polishing apparatus 300 includes a polishing liquid feeding nozzle 354 for feeding the polishing liquid or dressing liquid to the polishing pad 352. The polishing liquid and the dressing liquid are, for example, slurry and pure water, respectively. As shown in FIG. 1, the polishing table 350 and a table shaft 351 are provided with a passage 353 for feeding the polishing liquid. The passage 353 is in communication with an opening portion 355 formed in a surface of the polishing table 350. A through-hole 357 is formed in the polishing pad 352 at a position coinciding with the opening portion 355 of the polishing table 350. The polishing liquid passing through the passage 353 is fed onto the surface of the polishing pad 352 from the opening portion 355 of the polishing table 350 and the through-hole 357 of the polishing pad 352. The polishing table 350 and the polishing pad 352 may have one or more opening portions 355 and through-holes 357, respectively. The opening portion 355 of the polishing table 350 and the through-hole 357 of the polishing pad 352 may be disposed in freely-selected positions. According to one embodiment, the opening portion 355 of the polishing table 350 and the through-hole 357 of the polishing pad 352 are disposed near a center of the polishing table 350. The polishing apparatus 300 includes a dresser 356 for conditioning the polishing pad 352. The polishing apparatus 300 further includes an atomizer 358 for injecting liquid or a mixed fluid of liquid and gas toward the polishing pad 352. The liquid and gas injected from the atomizer 358 are, for example, pure water and a nitrogen gas, respectively.

The top ring 302 is supported by a top ring shaft 18. The top ring 302 is rotated around an axis of the top ring shaft 18 by a drive part, not shown, as illustrated by arrow AB as an example. The top ring shaft 18 is vertically movable by a drive mechanism, not shown. The polishing table 350 is supported by the table shaft 351. The polishing table 350 is rotated around an axis of the table shaft 351 by a drive part, not shown, as illustrated by arrow AC as an example.

The substrate WF is transferred in a state being vacuum-sucked by a surface of the top ring 302, which is opposed to the polishing pad 352. At the time of polishing, the polishing liquid is fed from the polishing liquid feeding nozzle 354 and/or the through-hole 357 of the polishing pad 352 to a polishing surface of the polishing pad 352. At the time of the polishing, the polishing table 350 and the top ring 302 are rotationally driven. The substrate WF is polished by being pressed against the polishing surface of the polishing pad 352 by the top ring 302.

As shown in FIG. 1, the top ring shaft 18 is joined to an arm 360. The arm 360 is swingable around a rotary shaft 362. The arm 360 may be fixed or swung so that the top ring 302 passes through a center of the polishing pad 352 during the polishing of the substrate WF. The arm 360 also may be fixed or swung so that the substrate WF covers the through-hole 357 of the polishing pad 352 during the polishing of the substrate WF.

Figure 2:
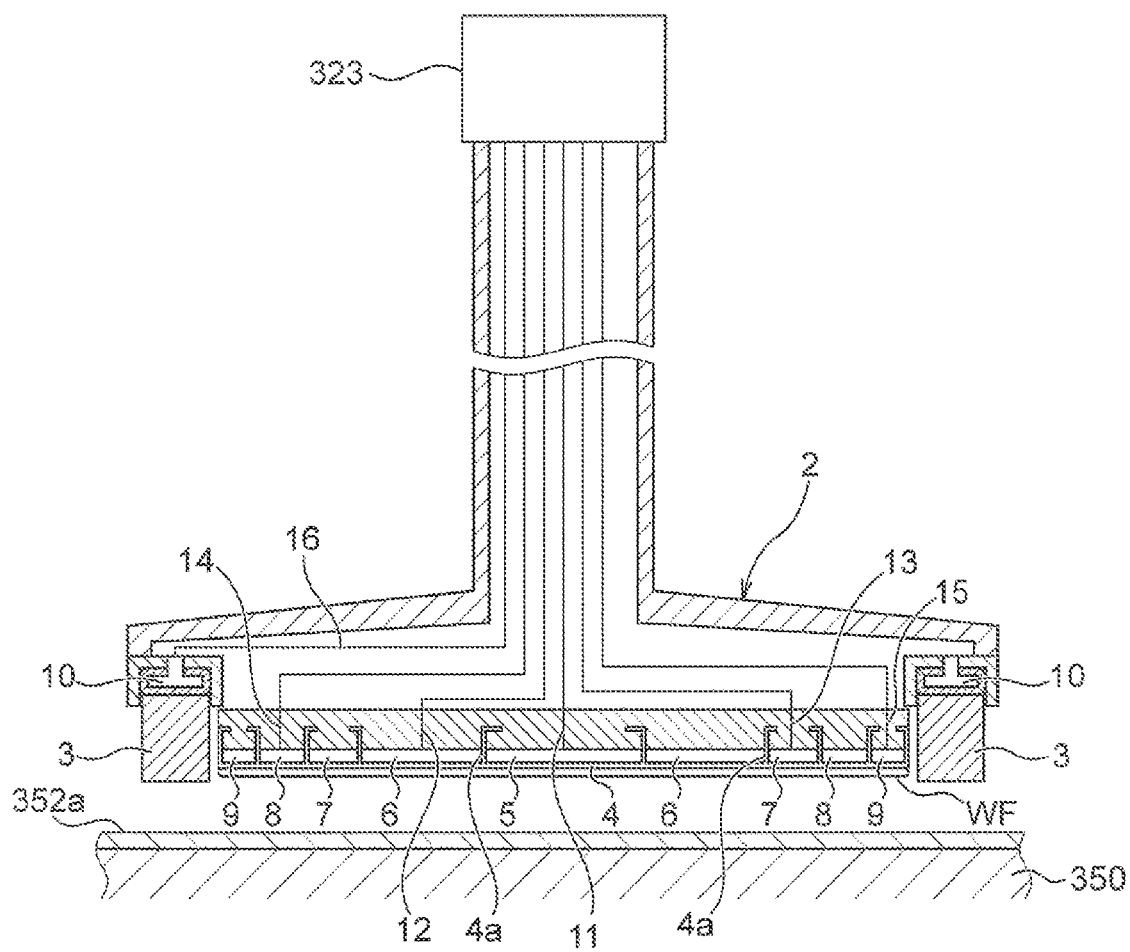
FIG. 2 is a schematic sectional view of a top ring which holds a substrate to be polished and presses the substrate against a polishing surface on a polishing pad according to one embodiment.

The top ring 302 of the polishing apparatus 300 according to one embodiment will be now discussed. FIG. 2 is a schematic sectional view of the top ring 302 which holds a substrate to be polished and presses the substrate against a polishing surface on a polishing pad according to one embodiment. FIG. 2 schematically shows only major constituent elements which construct the top ring 302.

As shown in FIG. 2, the top ring 302 includes a top ring body 2 which presses the substrate WF against a polishing surface 352a, and a retainer member 3 which directly presses the polishing surface 352a. The top ring body 2 comprises a flat plate-like member having a substantially quadrangular shape. The retainer member 3 is mounted on an outer peripheral portion of the top ring body 2. According to one embodiment, the retainer member 3 is a plate-like member having an elongated rectangular shape. According to one embodiment, the retainer member 3 is formed by arranging four plate-like members on the outer side of respective four sides of the quadrangular top ring body 2. Attached to a lower surface of the top ring body 2 is an elastic membrane (membrane) 4 which comes into contact with a back surface of the substrate. According to one embodiment, the elastic membrane (membrane) 4 is made of rubber material with high strength and durability. Such rubber materials include ethylene-propylene rubber (EPDM), polyurethane rubber, silicon rubber, etc. According to one embodiment, the elastic membrane (membrane) 4 can be made of rubber material by means of a mold.

The elastic membrane (membrane) 4 includes a plurality of concentric partition walls 4a. The partition walls 4a form a circular center chamber 5, a quadrangular loop-shaped ripple chamber 6 which encloses the center chamber 5, a quadrangular loop-shaped intermediate chamber 7 which encloses the ripple chamber 6, a quadrangular loop-shaped outer chamber 8 which encloses the intermediate chamber 7, and a quadrangular loop-shaped edge chamber 9 which encloses the outer chamber 8, between an upper surface of the elastic membrane 4 and the lower surface of the top ring body 2. In other words, the center chamber 5 is formed in a center portion of the top ring body 2. The ripple chamber 6, the intermediate chamber 7, the outer chamber 8, and the edge chamber 9 are concentrically arranged from a center toward an outer periphery in the order mentioned above. As shown in FIG. 2, a channel 11 in communication with the center chamber 5, a channel 12 in communication with the ripple chamber 6, a channel 13 in communication with the intermediate chamber 7, a channel 14 in communication with the outer chamber 8, and a channel 15 in communication with the edge chamber 9 are formed in an inner side of the top ring body 2. The channel 11 in communication with the center chamber 5, the channel 12 in communication with the ripple chamber 6, the channel 13 in communication with the intermediate chamber 7, the channel 14 in communication with the outer chamber 8, and the channel 15 in communication with the edge chamber 9 are connected through a rotary joint 323 to various fluid sources and vacuum sources.

According to one embodiment, a vacuum aperture is formed in the elastic membrane 4. The vacuum aperture is in communication with the ripple chamber 6 and enables the top ring 302 to vacuum-hold the substrate WF. The vacuum aperture is in communication with a passage, not shown, and is connected to a vacuum source. The substrate WF can be vacuumed onto the elastic membrane 4 of the top ring 302 using the vacuum aperture.

Formed above the retainer member 3 is a retainer member pressurization chamber 10 which is made of an elastic membrane. The retainer member pressurization chamber 10 is connected to a channel 16 formed in the inner side of the top ring body 2.

In the top ring 302 configured as shown in FIG. 2, the center chamber 5 is formed in the center portion of the top ring body 2, and the ripple chamber 6, the intermediate chamber 7, the outer chamber 8, and the edge chamber 9 are concentrically arranged from the center toward the outer periphery in the order mentioned above as already described. Pressures within the chambers can be individually adjusted. The foregoing structure makes it possible to adjust the pressing force which presses the substrate WF against the polishing pad 352 with respect to each region of the substrate WF, and furthermore makes it possible to adjust the pressing force, with which the retainer member 3 presses the polishing pad 352.

Figure 3:
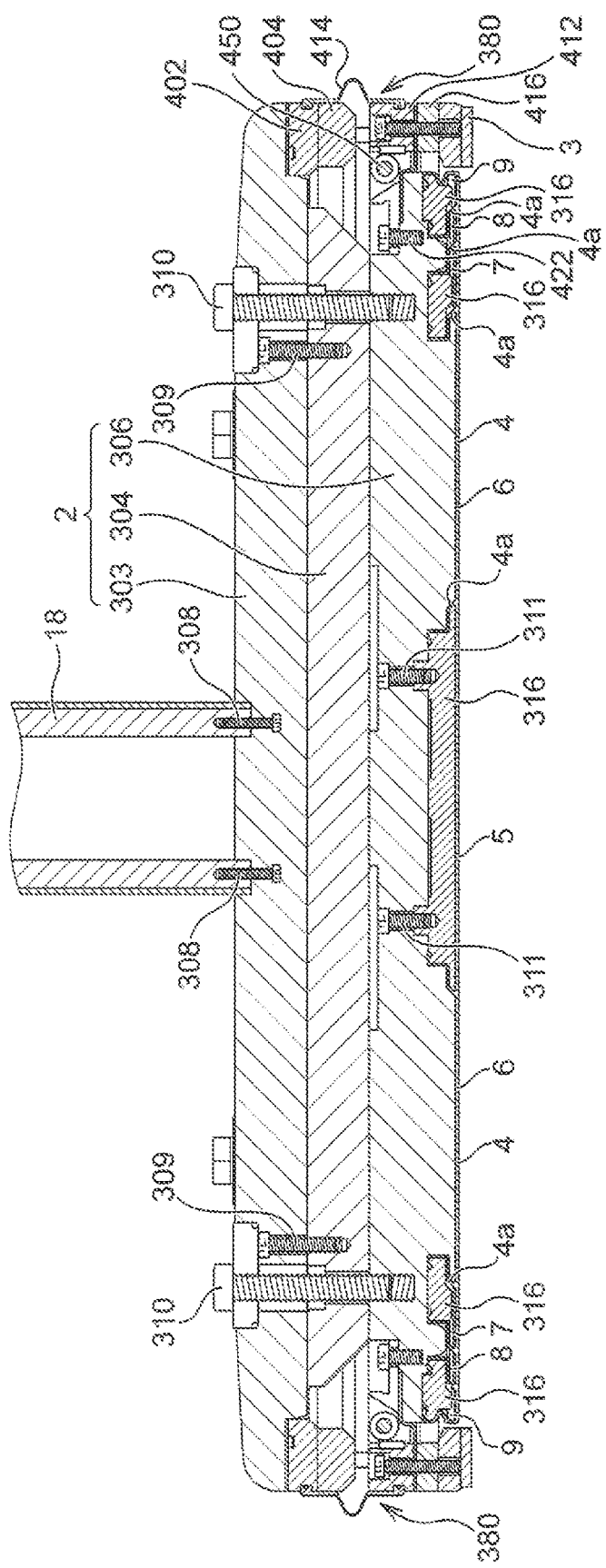
FIG. 3 is a sectional view showing a detailed structure of the top ring according to one embodiment.

FIG. 3 is a sectional view showing a detailed structure of the top ring 302 according to one embodiment. FIG. 3 corresponds to a sectional view of the top ring 302 of FIG. 1, taken along line arrow 3-3 of FIG. 1. According to the embodiment shown in FIG. 3, the top ring 302 includes the top ring body 2 and a retainer portion 380. The top ring body 2 includes a quadrangular plate-like upper member 303, an intermediate member 304 mounted on a lower surface of the upper member 303, and a lower member 306 mounted on a lower surface of the intermediate member 304. The retainer portion 380 is mounted on an outer peripheral portion of the upper member 303. The upper member 303 is joined to the top ring shaft 18 with bolts 308 or the like. The intermediate member 304 is joined to the upper member 303 with bolts 309 or the like. The lower member 306 is joined to the upper member 303 with bolts 310 or the like. The upper member 303, the intermediate member 304, and the lower member 306 can be made of metal material or plastic material. According to one embodiment, the upper member 303 is made of stainless steel (SUS), whereas the intermediate member 304 and the lower member 306 are made of plastic material.

As shown in FIG. 3, attached to a lower surface of the lower member 306 is the elastic membrane 4 which contacts the rear surface of the substrate WF. The elastic membrane 4 is attached to the lower surface of the lower member 306 by using three concentric holders 316 (one located in a center portion is a thin columnar member, and the other two surrounding the one in the center portion are quadrangular loop-shaped members) as shown in the figure. The holders 316 are fixed to the lower member 306 with bolts 311 or the like. The elastic membrane 4 can be attached to the lower surface of the lower member 306 by being sandwiched between the holders 316 on one side and the lower member 306 on the other.

As shown in FIG. 3, the center chamber 5, the ripple chamber 6, the intermediate chamber 7, the outer chamber 8, and the edge chamber 9 are defined by the elastic membrane 4 and the lower surface of the lower member 306. As shown in FIG. 2, the center chamber 5, the ripple chamber 6, the intermediate chamber 7, the outer chamber 8, and the edge chamber 9 are in communication with the channels 11, 12, 13, 14 and 15, respectively. Fluid is fed into the center chamber 5, the ripple chamber 6, the intermediate chamber 7, the outer chamber 8, and the edge chamber 9 through the foregoing channels, which makes it possible to control internal pressures of the chambers 5, 6, 7, 8 and 9 in a separate manner. When the substrate WF is polished, therefore, contact pressure which is applied to the polishing pad 352 can be controlled with respect to each area of the substrate WF.

Figure 4:
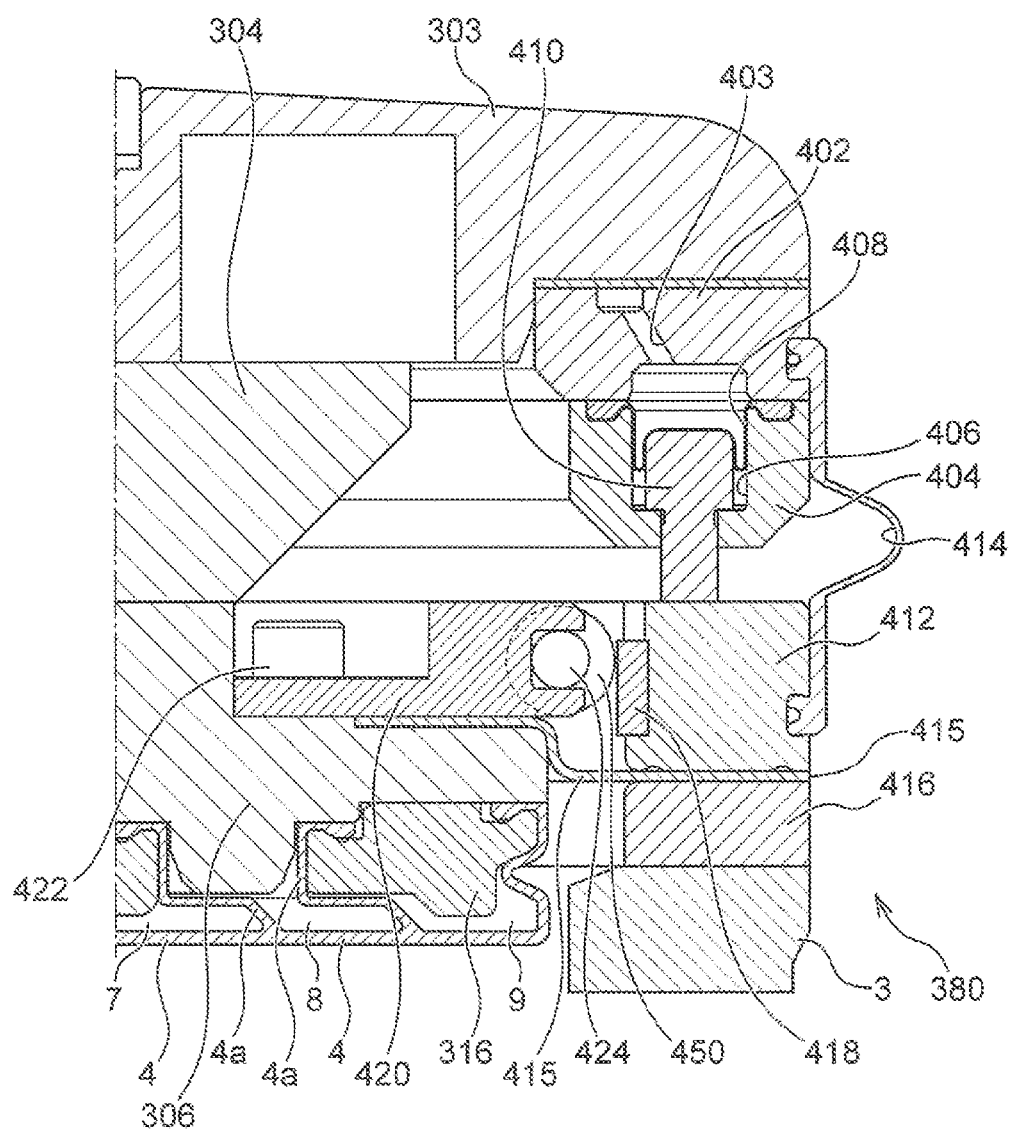
FIG. 4 is an enlarged sectional view of a retainer portion shown in the sectional view of FIG. 3.
Figure 5:
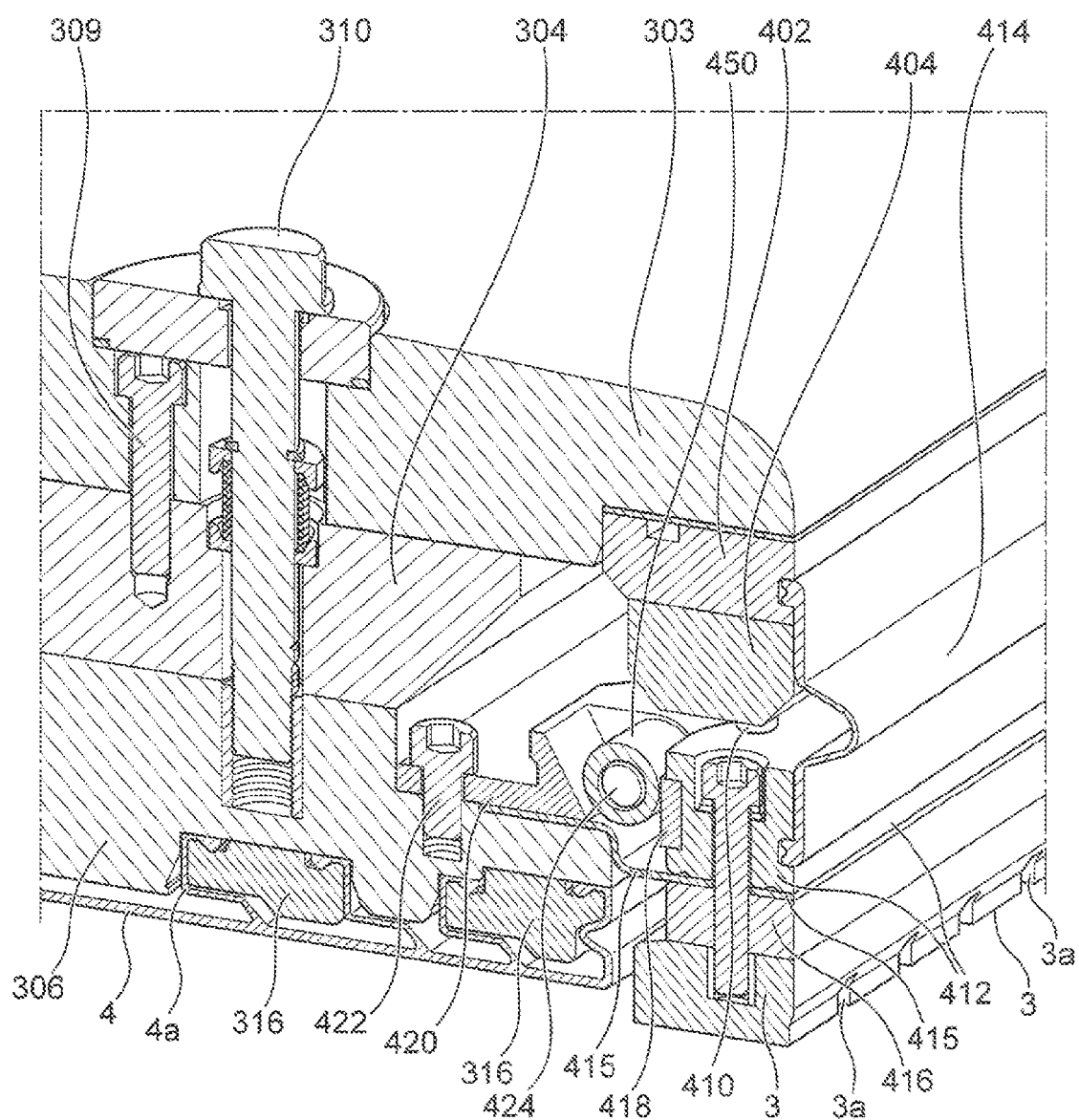
FIG. 5 is an enlarged sectional perspective view of the retainer portion shown in the sectional view of FIG. 3.

FIG. 4 is an enlarged sectional view of the retainer portion 380 shown in the sectional view of FIG. 3. FIG. 5 is an enlarged sectional perspective view of the retainer portion 380 shown in the sectional view of FIG. 3. As shown in the figures, the retainer portion 380 is provided to the outer peripheral portion of the upper member 303. As shown in the figures, an upper housing 402 is joined to a lower surface of the outer peripheral portion of the upper member 303. According to one embodiment, the upper housing 402 can be fixed to the upper member 303 with a bolt or the like with a seal packing intervening therebetween. Installed under the upper housing 402 is a lower housing 404. According to one embodiment, the upper housing 402 and the lower housing 404 together form a quadrangular loop-shaped member and can be made of polyphenylene sulfide (PPS) resin, for an example. A cylindrical cylinder 406 is defined inside the lower housing 404. Placed in the cylinder 406 is a diaphragm 408. According to one embodiment, the diaphragm 408 is made of rubber material. The diaphragm 408 can be secured by being held between the upper housing 402 and the lower housing 404. The cylinder 406 has an interior space which is divided by the diaphragm 408 into upper and lower spaces. A piston 410 is disposed in the diaphragm 408 of the lower housing 404. The piston 410 has one end which is in contact with a lower surface of the diaphragm 408. The other end of the piston 410 extends from the underside of the lower housing 404 and is in contact with a retainer supporting guide 412. According to one embodiment, the piston 410 can be made of PPS resin.

The upper housing 402 is provided with a passage 403 (shown as the channel 16 in FIG. 2). The passage 403 is connected to a fluid source, not shown. The fluid (air or nitrogen, for example) can be fed from the fluid source through the passage 403 into the upper space of the cylinder 406 of the lower housing 404. When the fluid is fed into the upper space of the cylinder 406, the diaphragm 408 expands downwards to move the piston 410 in the downward direction. The downward motion of the piston 410 enables the retainer supporting guide 412 to move in the downward direction.

According to one embodiment, as shown in FIGS. 4 and 5, a band 414 extends between and is attached to an outer lateral surface of the upper housing 402 and an outer lateral surface of the retainer supporting guide 412. The band 414 allows the retainer supporting guide 412 to displace relative to the lower housing 404 and prevents polishing liquid or the like from entering a space between the lower housing 404 and the retainer supporting guide 412.

As shown in the figure, a retainer guide 416 is mounted on a lower surface of the retainer supporting guide 412. According to one embodiment, as shown in the figure, a seal packing 415 made of rubber material or the like is disposed between the retainer supporting guide 412 and the retainer guide 416. The retainer member 3 is mounted on a lower surface of the retainer guide 416 as shown in the figure. As shown in FIG. 5, the retainer supporting guide 412, the retainer guide 416, and the retainer member 3 can be bolted. The retainer supporting guide 412 and the retainer guide 416 together form a quadrangular loop-shaped member. According to one embodiment, the retainer supporting guide 412 and the retainer guide 416 are made of stainless steel (SUS). The retainer member 3 is made of PPS resin, polyvinyl chloride resin or the like. As described above, the retainer member 3 is moved downwards by moving the retainer supporting guide 412 in the downward direction by the piston 410 disposed in the lower housing 404.

According to one embodiment, the top ring 302 includes a retainer guiding device which guides the retainer member 3 so that the retainer member 3 can be displaced in a vertical direction, and yet supports the retainer member 3 so as to inhibit the retainer member 3 from displacing in a horizontal direction. According to one embodiment, as shown in FIGS. 4 and 5, the retainer supporting guide 412, the retainer guide 416, and the retainer member 3 are movable in the vertical direction by being supported and guided by a supporting roller 450. As shown in the figures, a supporting pad 418 is fixed on an inner lateral surface of the retainer supporting guide 412. As shown in the figures, the retainer supporting guide 412, the retainer guide 416, and the retainer member 3 move in the vertical direction while the supporting pad 418 fixed to the retainer supporting guide 412 is in contact with and supported by the supporting roller 450. One embodiment may be so configured that a small gap is created between the supporting pad 418 fixed to the retainer supporting guide 412 and the supporting roller 450. According to one embodiment, the supporting pad 418 can be made of PPS resin, vinyl chloride resin, PEEK resin or the like.

As shown in FIGS. 4 and 5, a retainer supporting frame 420 is fixed to the lower member 306 of the top ring body 2. As shown in FIG. 5, the retainer supporting frame 420 is fixed to the lower member 306 with a bolt 422. As shown in FIGS. 4 and 5, the seal packing 415 is sandwiched between the lower member 306 and the retainer supporting frame 420. As shown in figures, the seal packing 415 extends from a region between the lower member 306 and the retainer supporting frame 420 to a region between the retainer supporting guide 412 and the retainer guide 416. It can also be said that the seal packing 415 extends from the top ring body 2 to the retainer portion 380. The seal packing 415 is then capable of preventing the polishing liquid or the like from entering the inner side of the top ring 302 from between the top ring body 2 and the retainer portion 380.

As shown in FIG. 5, a shaft 424 is fixed to the retainer supporting frame 420. According to one embodiment, a bolt or the like is used to fix the shaft 424 to the retainer supporting frame 420. The shaft 424 extends parallel to a surface of the top ring body 2, on which the substrate WF is held. It can also be said that the shaft 424 extends in a direction parallel to sides of a quadrangular shape of the top ring body 2 having a substantially quadrangular shape. According to one embodiment, the supporting roller 450 is mounted around the shaft 424 through a low friction sliding bearing. The supporting roller 450 is freely rotatable around the shaft 424. According to one embodiment, the shaft 424 and the supporting roller 450 are made of metal, such as SUS. According to one embodiment, the low friction sliding bearing is made of oil-impregnated polyacetal. According to one embodiment, the low friction sliding bearing may be a cylindrical roller bearing. According to one embodiment, the supporting roller 450 comprises a plurality of supporting rollers 450. Each of the supporting rollers 450 is disposed along each side of the retainer portion 380 having a quadrangular loop-shaped shape.

According to the above-discussed embodiment, a rotating force of the top ring shaft 18 is transmitted to the upper member 303, the intermediate member 304, and the lower member 306. The rotating force is further transmitted from the retainer supporting frame 420 fixed to the lower member 306 to the supporting roller 450, and then transmitted from the supporting roller 450 through the supporting pad 418 to the retainer portion 380. The rotating force of the top ring body 2 of the top ring 302 is consequently transmitted through the supporting roller 450 to the retainer portion 380.

According to the above-discussed embodiment, the fluid is fed through the passage 403 to the cylinder 406 to drive the piston 410 through the diaphragm 408. The retainer member 3 is thus moved in the vertical direction and pressed against the polishing pad 352. The pressure with which the retainer member 3 is pressed against the polishing pad 352 can be controlled by pressure of the fluid which is fed to the cylinder 406. According to the above-discussed embodiment, during the vertical motion of the retainer member 3, the retainer member 3 is guided by the supporting roller 450, which reduces resistance between the supporting roller 450 and the supporting pad 418.

Figure 6:
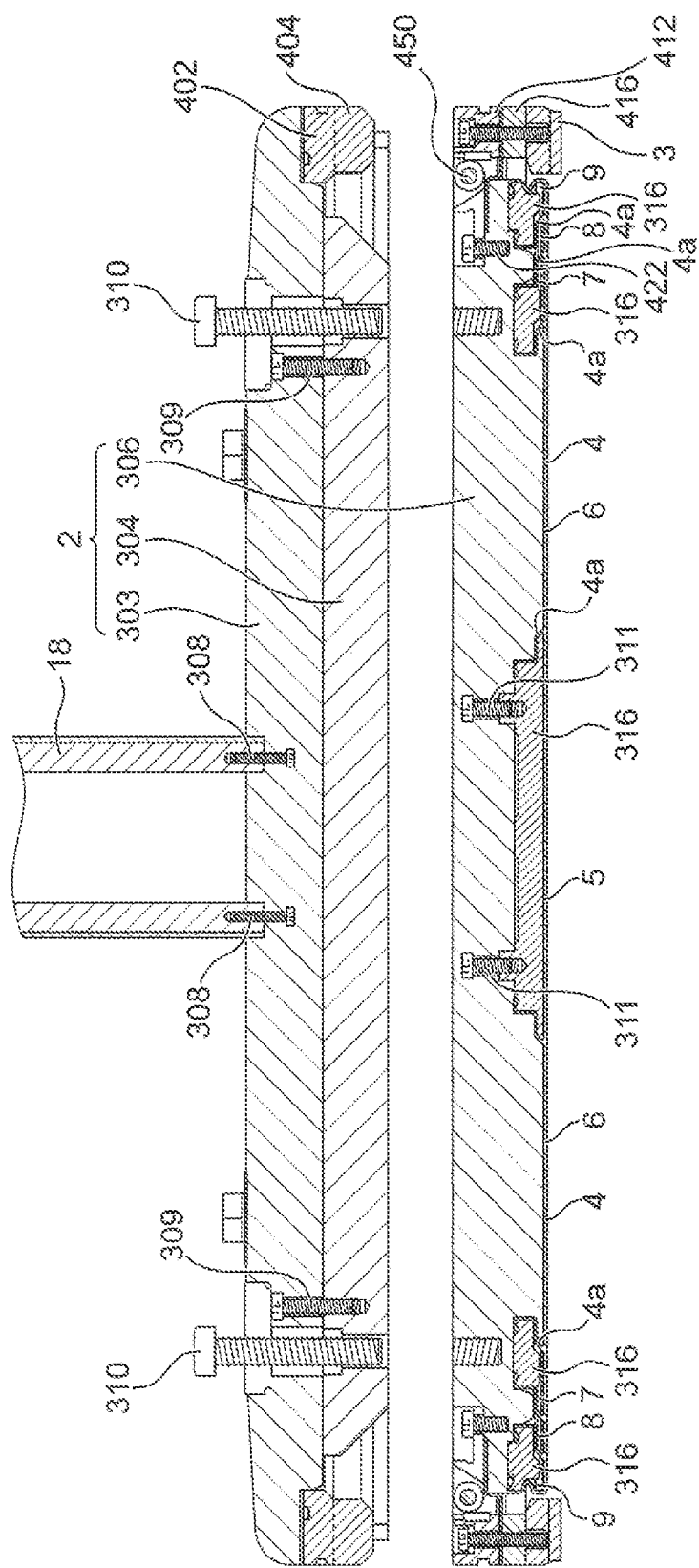
FIG. 6 shows the top ring of FIG. 5 with a lower member dismounted.

The top ring 302 according to the above-discussed embodiment is so configured that the bolts 310 enable the lower member 306 to be dismounted from the upper member 303 and the intermediate member 304. The lower member 306 is dismounted from the top ring 302, for example, for the purpose of replacing the elastic membrane 4, the retainer member 3, the supporting roller 450 and the like when the polishing apparatus 300 receives maintenance. FIG. 6 shows the top ring 302 of FIG. 3 with the lower member 306 dismounted. According to the embodiment shown in FIG. 6, the retainer supporting frame 420, the supporting roller 450, the retainer supporting guide 412, the retainer guide 416, and the retainer member 3, which are fixed to the lower member 306, are also separated in addition to the lower member 306.

In a polishing apparatus, a jig is sometimes used to dismount a part or parts from a top ring. The following description discusses a jig which can be used to dismount and mount the lower member 306 of the top ring 302 from and on the upper member 303 and the intermediate member 304. According to one embodiment, the jig is capable of holding the lower member 306. According to one embodiment, the jig is capable of holding and raising/lowering the lower member 306 at the same time. According to one embodiment, the jig is capable of holding the lower member 306 and moving on the polishing table 350 at the same time.

Figure 7:
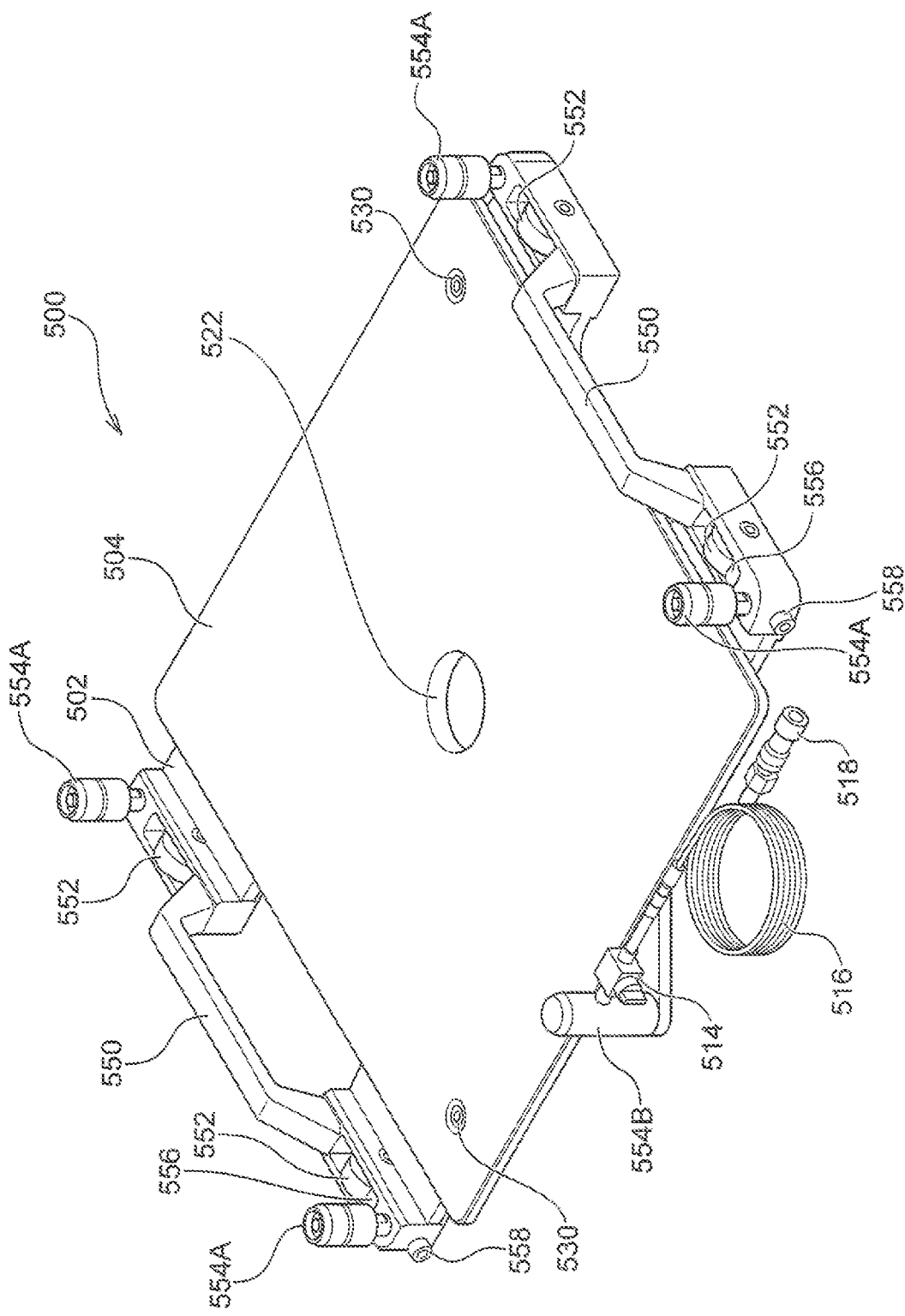
FIG. 7 is a perspective view of a jig according to one embodiment.
Figure 8:
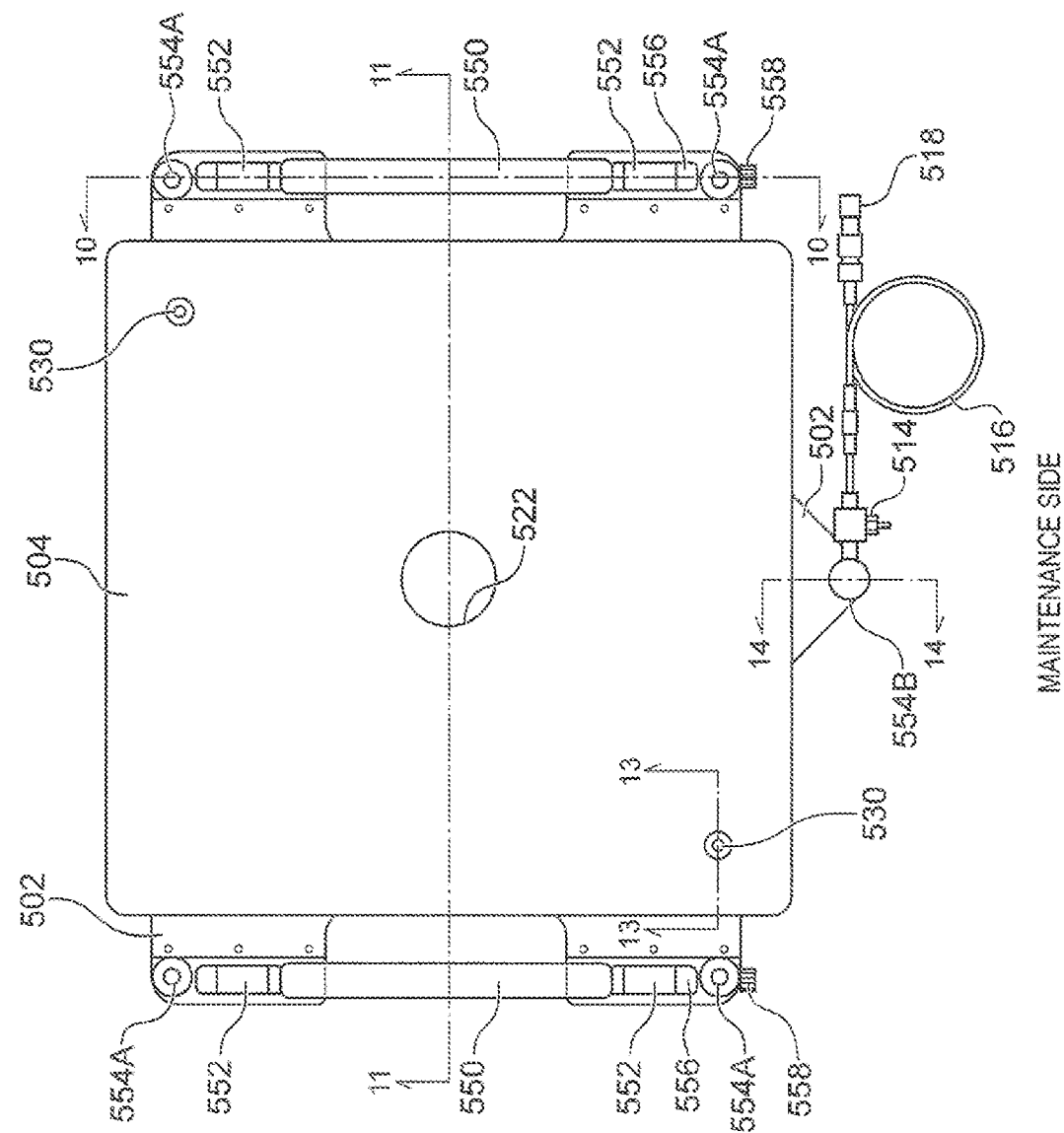
FIG. 8 is a top view of the jig shown in FIG. 7.
Figure 9:
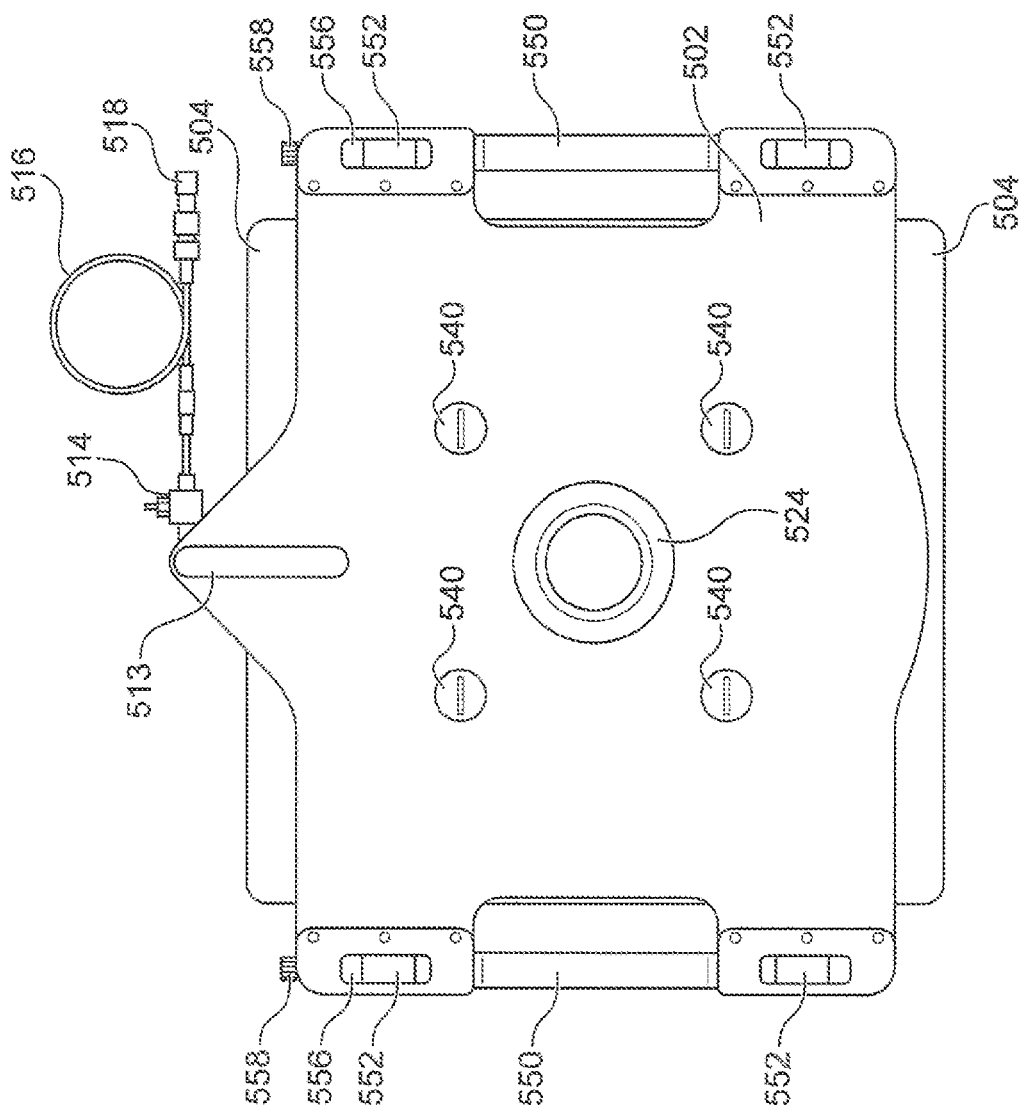
FIG. 9 is a bottom view of the jig shown in FIG. 7.
Figure 10:
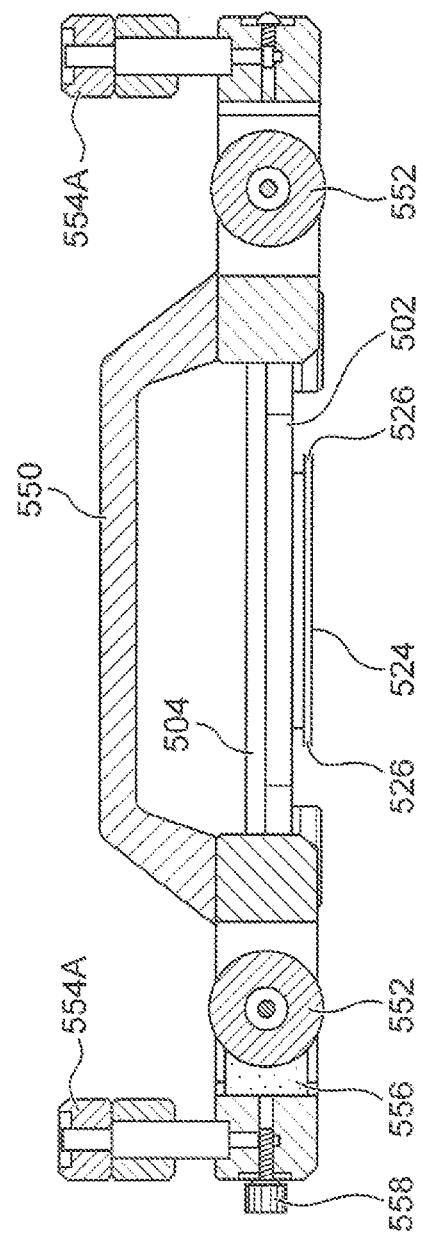
FIG. 10 is a sectional view of the jig as viewed in a direction of arrows 10 of FIG. 8.
Figure 11:
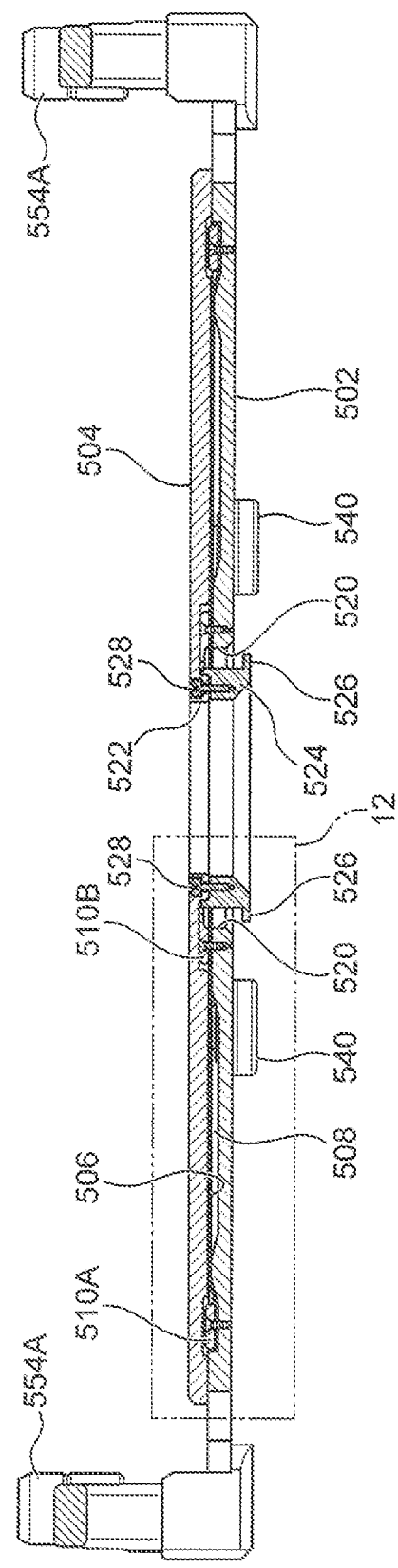
FIG. 11 is a sectional view of the jig as viewed in a direction of arrows 11 of FIG. 8.
Figure 12:
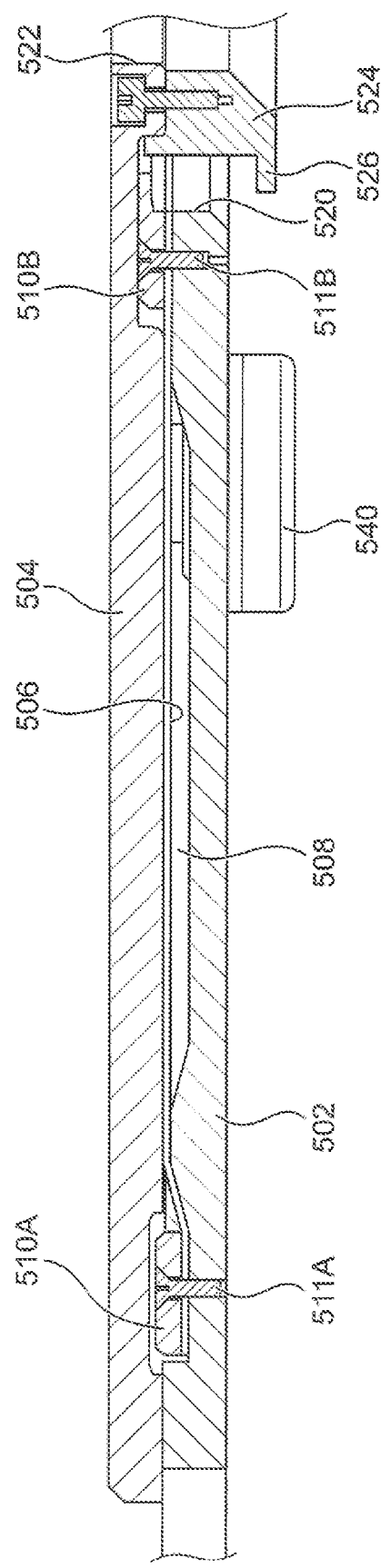
FIG. 12 is an enlarged view of a region 12 shown in FIG. 11.
Figure 13:
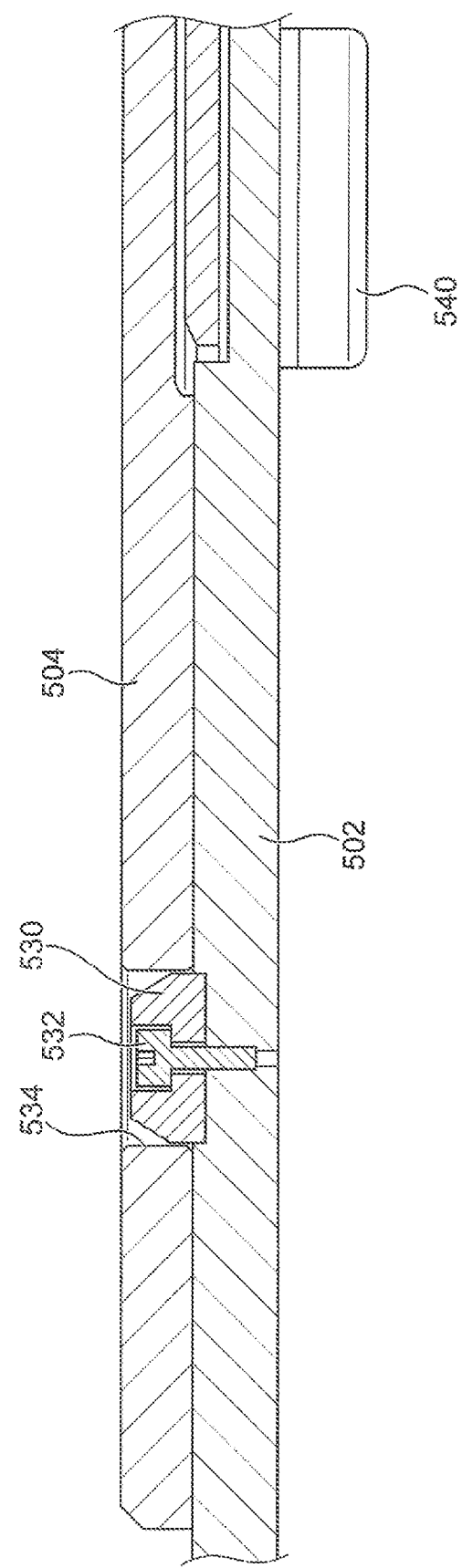
FIG. 13 is a sectional view of the jig as viewed in a direction of arrows 13 shown in FIG. 8.
Figure 14:
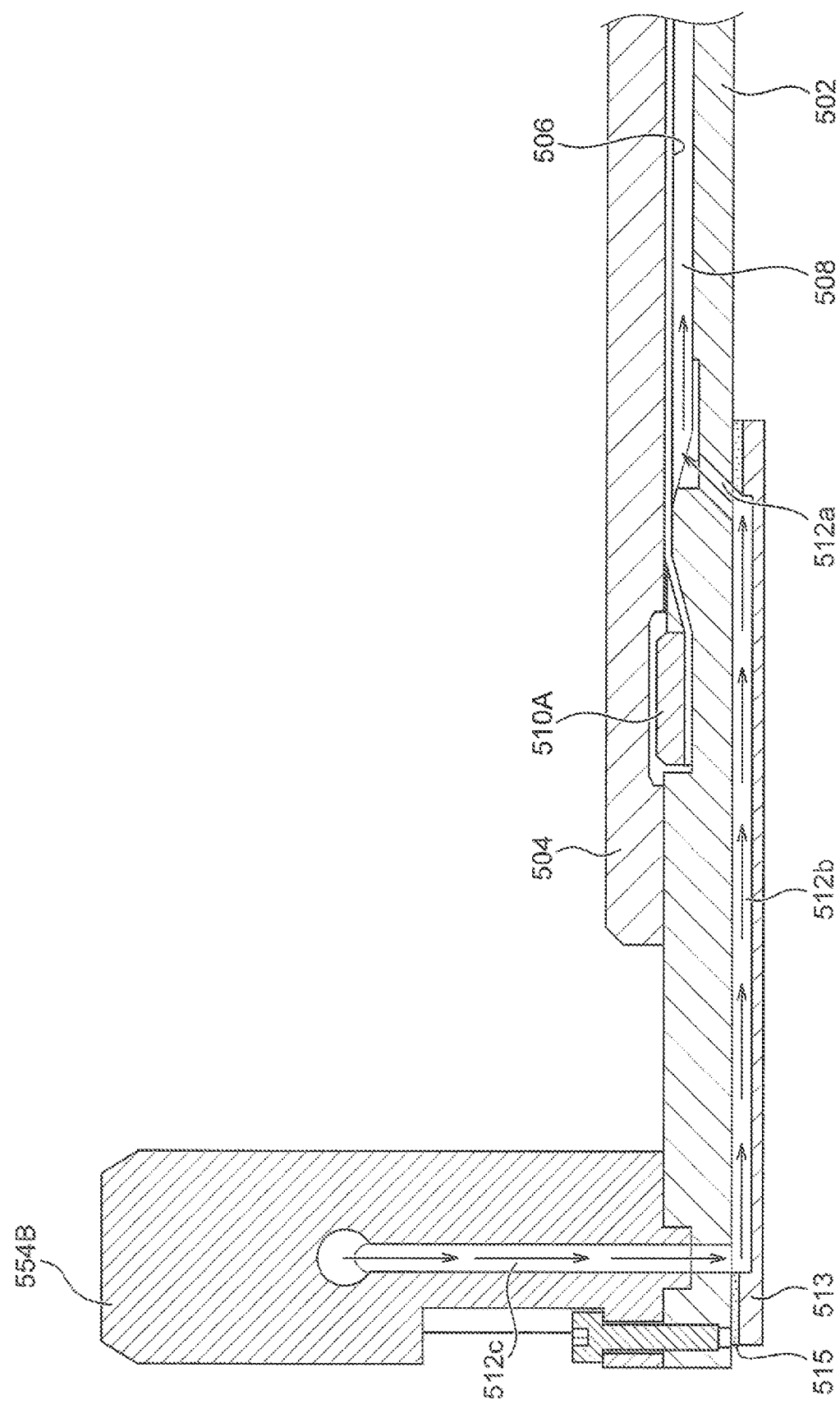
FIG. 14 is a sectional view of the jig as viewed in a direction of arrows 14 shown in FIG. 8.
Figure 22:
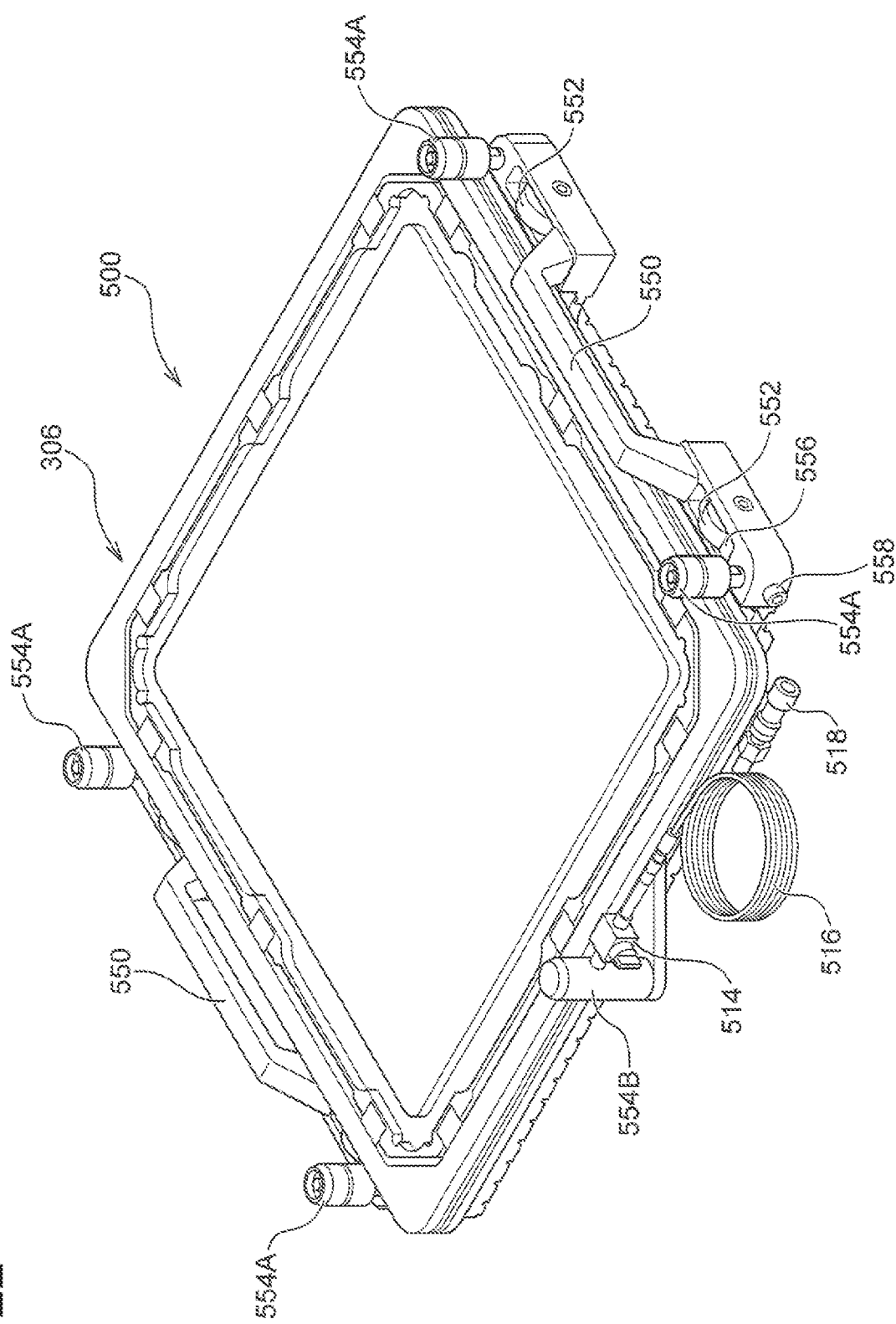
FIG. 22 is a perspective view showing the lower member of the top ring as it would appear when located on the movable plate of the jig according to one embodiment.

FIG. 7 is a perspective view of a jig 500 according to one embodiment. FIG. 8 is a top view of the jig 500 shown in FIG. 7. FIG. 9 is a bottom view of the jig 500 shown in FIG. 7. FIG. 10 is a sectional view of the jig 500 as viewed in a direction of arrows 10 of FIG. 8. FIG. 11 is a sectional view of the jig 500 as viewed in a direction of arrows 11 of FIG. 8. FIG. 12 is an enlarged view of a region 12 shown in FIG. 11. FIG. 13 is a sectional view of the jig 500 as viewed in a direction of arrows 13 shown in FIG. 8. FIG. 14 is a sectional view of the jig 500 as viewed in a direction of arrows 14 shown in FIG. 8. FIG. 22 is a perspective view showing the lower member 306 of the top ring 302 as it would appear when located on a movable plate 504 of the jig 500 according to one embodiment.

The jig 500 according to the embodiment shown in the figures includes a base plate 502. Placed on the base plate 502 is the movable plate 504. The movable plate 504 is capable of supporting the lower member 306 of the top ring 302 as discussed later. The movable plate 504 is movable in a height direction (direction perpendicular to a surface of the movable plate 504) as discussed later. The movable plate 504 in a planar view has a similar shape to the lower member 306. The movable plate 504 has substantially equal area to the lower member 306. According to the embodiment shown in the figures, since the top ring 302 has a quadrangular shape, the movable plate 504 also has a quadrangular shape. If the top ring 302 and the lower member 306 both have a circular shape in another embodiment, the movable plate 504 may also have a circular shape that is substantially equal in size to the lower member 306.

According to the embodiment shown in the figures, the jig 500 includes a handle 550. According to the embodiment shown in the figures, the handle 550 comprises two handles 550 joined to the base plate 502. An operator can carry the jig 500 by the handles 550.

According to the embodiment shown in the figures, the jig 500 includes a roller 552. According to the embodiment shown in the figures, the roller 552 comprises four rollers 552 mounted on the base plate 502. The rollers 552 are rotatable. The rollers 552 are used to move the jig 500 on the polishing table 350. According to the embodiment shown in the figures, the four rollers 552 are arranged in the same direction. This makes the jig 500 movable basically in a linear direction only. According to the embodiment shown in the figures, the jig 500 includes a brake pad 556 for preventing rotation of the roller 552, and further includes a brake bolt 558 for pressing the brake pad 556 against the roller 552 (FIG. 10). According to the embodiment shown in the figures, the brake pad 556 and the brake bolt 558 comprise two brake pads 556 and two brake bolts 558, respectively, which are provided to the two respective rollers 552 as shown on a lower side of FIG. 8 (also referred to as a "maintenance side"). The brake bolts 558 are turned and moved forward, to thereby press the brake pads 556 against the rollers 552. The rollers 552 are thus prevented from rotating. The jig 500 disclosed in the present description may be disposed on the polishing table 350 which is not provided with the polishing pad 352 or disposed on the polishing pad 352 which is placed on the polishing table 350. In the present description and drawings, therefore, the phrases "on the polishing table 350" and "surface of the polishing table 350" can mean "on the polishing table 350 which is not provided with the polishing pad 352" and "surface of the polishing table 350 which is not provided with the polishing pad 352," respectively, or "on the polishing pad 352 placed on the polishing table 350" and "surface of the polishing pad 352 placed on the polishing table 350," respectively. For example, when it is described that the jig 500 is disposed on the polishing table 350, the description can mean either that the jig 500 is disposed directly on the polishing table 350 which is not provided with the polishing pad 352 or that the jig 500 is disposed on the polishing pad 352 placed on the polishing table 350.

According to the embodiment shown in the figures, the jig 500 includes a plurality of posts 554A and 554B. According to the embodiment shown in the figures, two posts 554A are disposed in each of two opposite sides of the jig 500, and one post 554B is disposed in one of the other sides of the jig 500. According to the embodiment shown in the figures, the post 554B is disposed in the maintenance side. The posts 554A and 554B are intended to guide the jig 500 to right under the top ring 302 when the jig 500 is moved on the polishing table 350 to under the top ring 302. When the jig 500 is moved on the polishing table 350 to right under the top ring 302, the four posts 554A are engaged with the upper member 303 of the top ring 302 to guide the jig 500 toward the top ring 302 in a linear manner, and the posts 554B are engaged with the upper member 303 to stop the jig 500 at a position right under the top ring 302. Instead of being engaged directly with the upper member 303 of the top ring 302, the posts 554A and 554B may be engaged with another member which is fixed to the upper member 303. For example, the posts 554A and 554B may be engaged with the upper housing 402 or the lower housing 404.

Figure 15:
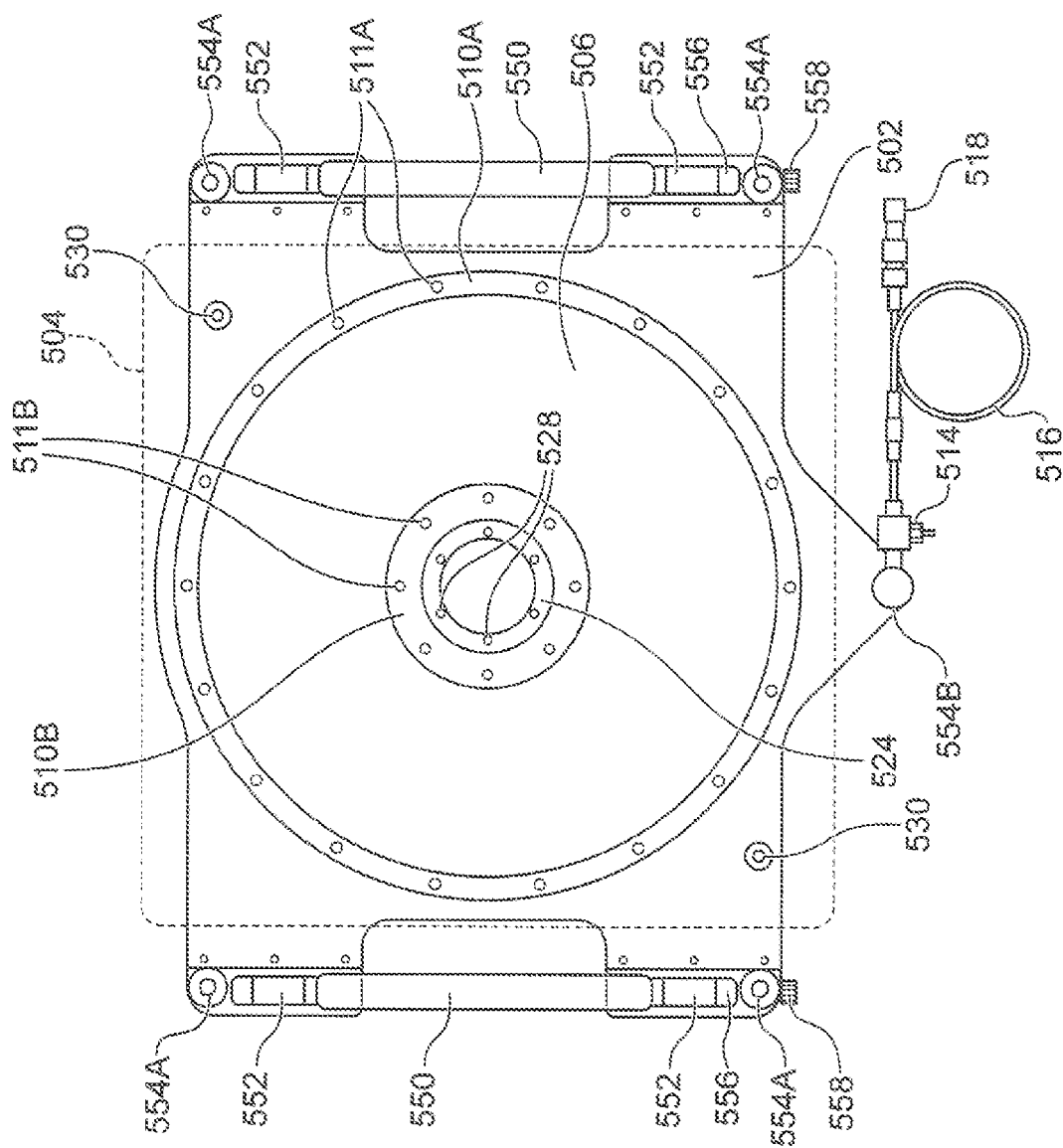
FIG. 15 is a top view of the jig with a movable plate dismounted, which is shown in FIG. 8.

As shown in FIGS. 11, 12 and 14, in jig 500 according to one embodiment, an elastic membrane 506 is disposed between the base plate 502 and the movable plate 504. As shown in the figures, a pressure chamber 508 is formed between the base plate 502 and the elastic membrane 506. FIG. 15 is a top view of the jig 500 with the movable plate 504 dismounted, which is shown in FIG. 8. In FIG. 15, a position in which the movable plate 504 is disposed is shown by a broken line. According to the embodiment shown in the figure, the elastic membrane 506 is in the form of a ring-like sheet. The elastic membrane 506 is fixed to the base plate 502 by a holder 510. According to the embodiment shown in the figure, the ring-like elastic membrane 506 is fixed to the base plate 502 with an outer peripheral portion sandwiched between a ring-like holder 510A and the base plate 502, and with an inner peripheral portion sandwiched between a ring-like holder 510B and the base plate 502. As shown in the figure, the holders 510A and 510B can be fixed to the base plate 502 with screws 511A and 511B, respectively.

According to one embodiment, the jig 500 includes a passage 512 for feeding the fluid into the pressure chamber 508 formed between the base plate 502 and the elastic membrane 506. As shown in FIG. 14, a passage 512a is formed in the base plate 502. The passage 512a has one end which opens into the pressure chamber 508 formed between the base plate 502 and the elastic membrane 506. As shown in FIGS. 9 and 14, attached to a lower surface of the base plate 502 is a cover plate 513 extending from the passage 512a of the base plate 502 to a lower surface of the post 554B. As shown in FIG. 14, the cover plate 513 is attached to the base plate 502 with a packing 515 intervening therebetween. As shown in FIG. 14, a passage 512b is formed in the cover plate 513. The passage 512b is in communication with the passage 512a of the base plate 502. The passage 512b of the cover plate 513 is in communication with a passage 512c formed in the post 554B. The passage 512c of the post 554B has an end portion which is connectable to a fluid source as discussed later. According to one embodiment, as shown in FIG. 14, the passage 512 extends from the base plate 502 into the post 554B. According to the embodiment shown in the figure, a tube 516 is connected to the post 554B via a switching valve 514. A coupler 518 is connected to an end portion of the tube 516, which is located on an opposite side to the switching valve 514. Connected to the coupler 518 is a fluid source or a fluid feeding circuit for feeding air, nitrogen or the like. According to the embodiment shown in the figure, the fluid, such as air and nitrogen, can be fed into the pressure chamber 508 through the tube 516 and the passage 512. The elastic membrane 506 expands upwards as pressure in the pressure chamber 508 is increased. The movable plate 504 lying on the elastic membrane 506 thus also moves in the upward direction.

According to the embodiment shown in the figure, a through-hole 520 is formed near a center of the base plate 502, and similarly, a through-hole 522 is formed near a center of the movable plate 504. The through-hole 520 of the base plate 502 and the through-hole 522 of the movable plate 504 are formed in a concentric manner. According to the embodiment shown in FIGS. 11 and 12, a stopper 524 is mounted under the movable plate 504 in a concentric manner with the through-hole 522 of the movable plate 504. According to the embodiment shown in the figure, the stopper 524 is a cylindrical member. The stopper 524 is fixed to the movable plate 504 with screws 528 as shown in the figure. The cylindrical stopper 524 extends through the through-hole 520 of the base plate 502. As shown in FIGS. 11 and 12, the cylindrical stopper 524 includes a flange 526 in an opposite end portion to the movable plate 504. The flange 526 expands in a radially outward direction. Since the stopper 524 is fixed to the movable plate 504, the stopper 524 moves together with the movable plate 504. The flange 526 has a larger diameter than the through-hole 520 of the base plate 502. Alternatively, the flange 526 has a larger diameter than a member fixed to the base plate 502 and extends more inwards than the through-hole 520. According to the embodiment shown in FIGS. 11 and 12, the holder 510B is mounted near the through-hole 520 of the base plate 502. A part of the holder 510B extends more inwards than the through-hole 520. When the movable plate 504 moves in the upward direction, therefore, the flange 526 of the stopper 524 comes into contact with the holder 510B fixed to the base plate 502. The stopper 524 thus can regulate the motion of the movable plate 504 within a predetermined range. According to another embodiment, the flange 526 of the stopper 524 may be configured to contact the base plate 502.

According to one embodiment, as shown in FIGS. 7, 8 and 13, a plurality of guide pins 530 are mounted on the base plate 502. The guide pins 530 are protruding upwards from the base plate 502. As shown in the figures, the guide pins 530 are fixed to the base plate 502 with screws 532. The guide pin 530 preferably comprises two or more guide pins 530. The embodiment shown in the figures includes two guide pins 530. As shown in FIG. 13, through-holes 534 are formed in the movable plate 504 at positions coinciding with the guide pins 530. As shown in the figures, the guide pins 530 are located inside the through-holes 534 when the movable plate 504 is in a lowered position. The guide pins 530 thus function to position the movable plate 504 when the movable plate 504 is lowered.

In the jig 500 according to the embodiment shown in the figures, a plurality of leg pads 540 are provided to the lower surface of the base plate 502. The jig 500 according to the embodiment shown in the figures is provided with four leg pads 540 as shown in FIG. 9. Lowermost surfaces of the leg pads 540 are on a slightly higher level than lowermost surfaces of the rollers 552. When the base plate 502 is pressed downwards by a reactive force generated when the jig 500 holds the lower member 306 above the movable plate 504 to raise the lower member 306, the leg pads 540 contact the polishing table 350 and support the reactive force. Since the lowermost surfaces of the leg pads 540 are on a slightly higher level than the lowermost surfaces of the rollers 552 when the movable plate 504 is not driven, the jig 500 can be moved on the polishing table 350 using the rollers 552. The rollers 552 and the leg pads 540 are preferably made of resin, such as plastic, which does not affect the polishing pad 352.

Figure 16:
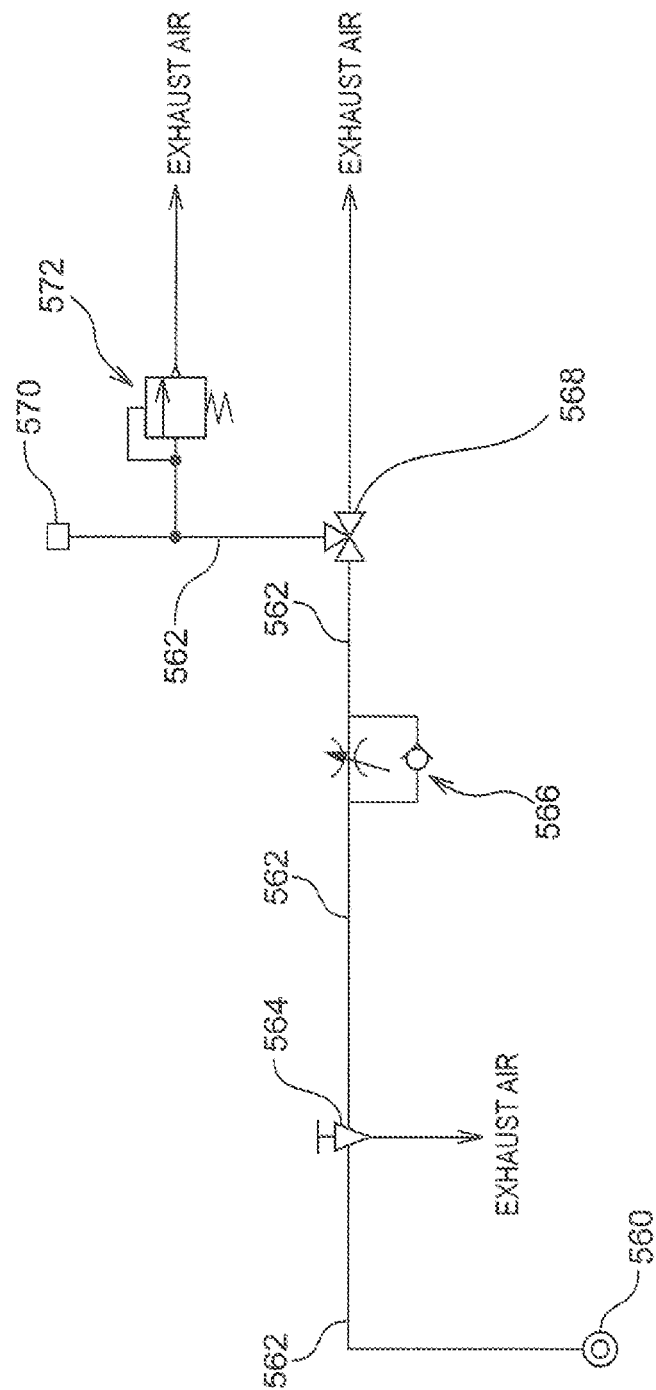
FIG. 16 is a schematic view of a fluid feeding mechanism for feeding fluid into a pressure chamber of the jig according to one embodiment.

FIG. 16 is a schematic view of a fluid feeding mechanism for feeding fluid into the pressure chamber 508 of the jig 500 according to one embodiment. As shown in FIG. 16, the fluid feeding mechanism includes a duct 562 joined to a fluid source 560. The fluid to be fed may be, for example, compressed air or nitrogen. The fluid source 560 may be provided either inside or outside the polishing apparatus 300. As shown in FIG. 16, a regulator 564 is placed in the duct 562. The regulator 564 is intended to reduce pressure in the duct 562 to exhaust air. A variable throttle 566 is placed in the duct 562. The variable throttle 566 is a valve for regulating a flow rate within the duct 562. A three-way valve 568 is also placed in the duct 562. One side of the three-way valve 568 is an exhaust side, and the other side is joined to a coupler 570 side of the duct 562. The coupler 570 can be joined to the coupler 518 of the jig 500. A relief valve 572 is placed between the coupler 570 and the three-way valve 568, preventing the elastic membrane 506 of the jig 500 from being applied with excessive pressure. The relief valve 572 may be omitted.

Figure 17:
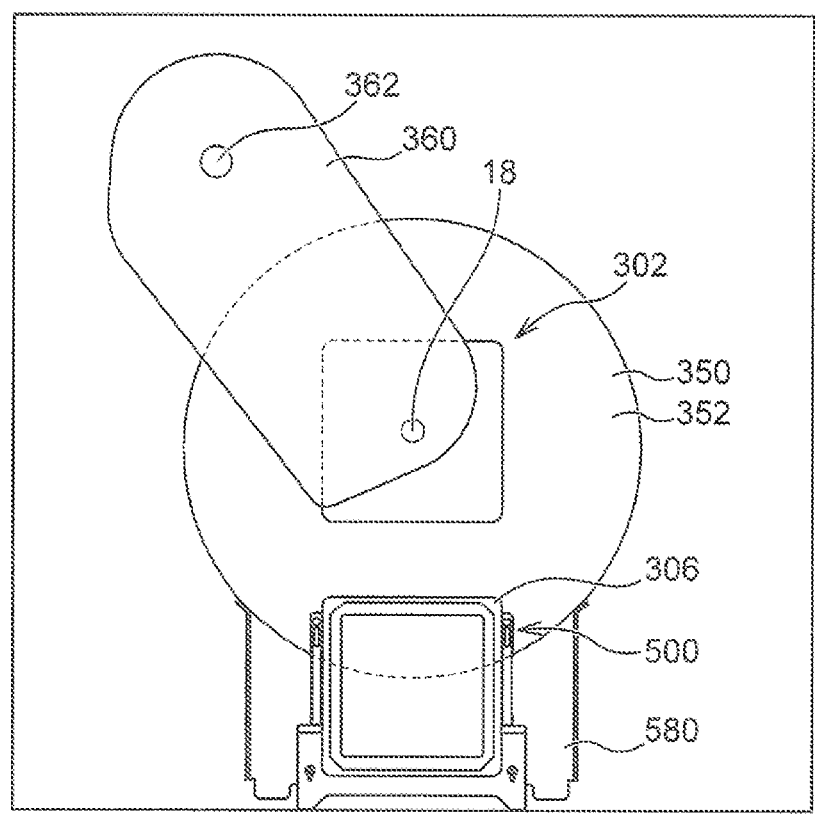
FIG. 17 is a top view showing the jig and the top ring as they would appear when the jig is used to mount or dismount the lower member of the top ring on or from upper and intermediate members according to one embodiment.

FIG. 17 is a top view showing the jig 500 and the top ring 302 as they would appear when the jig 500 is used to mount or dismount the lower member 306 of the top ring 302 on or from the upper member 303 and the intermediate member 304 according to one embodiment. In FIG. 17, the top ring 302 is brought to a maintenance position by turning the arm 360.

Figure 18:
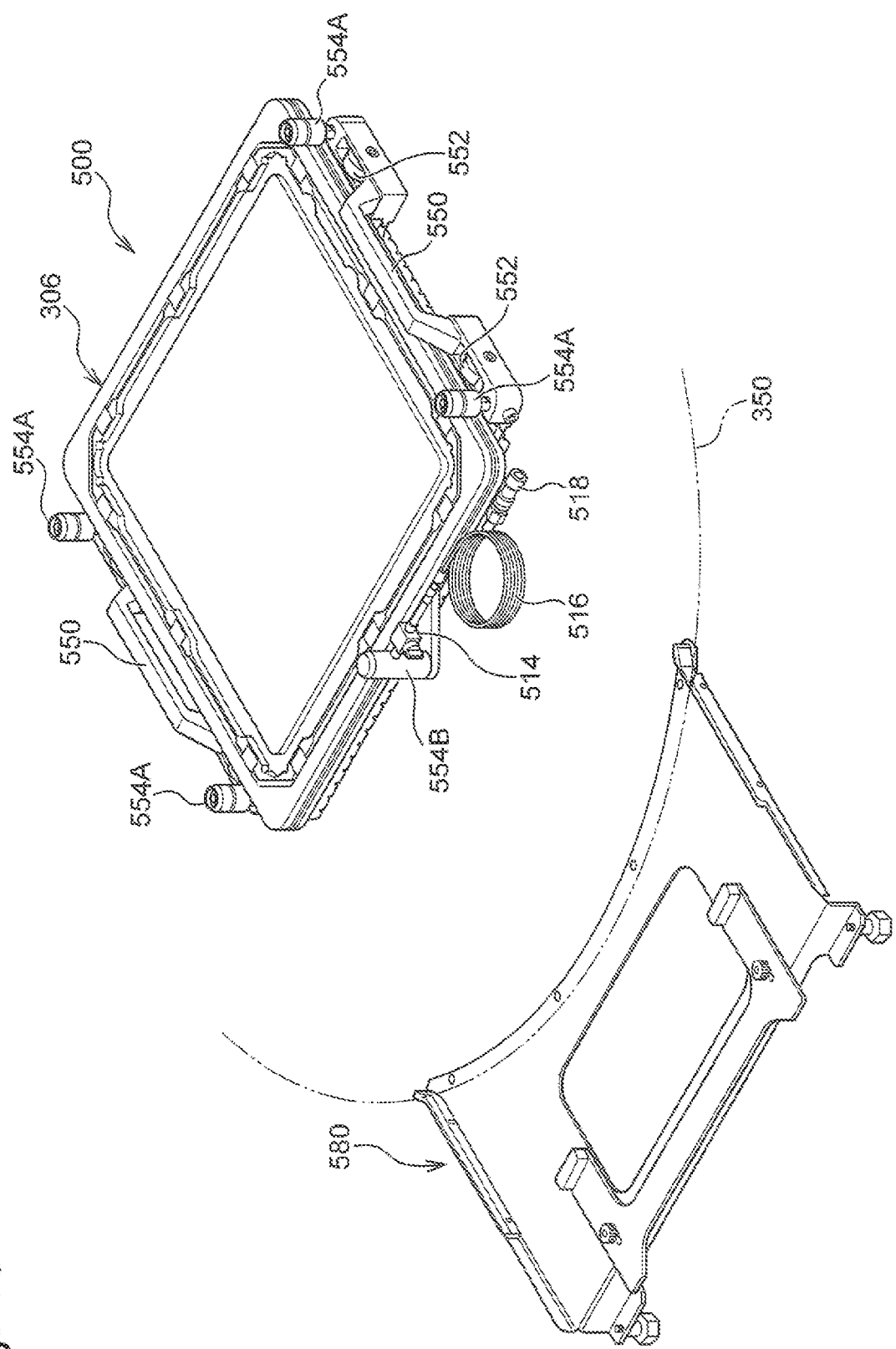
FIG. 18 is a schematic perspective view of an extension table according to one embodiment.

As shown in FIG. 17, the jig 500 is disposed on the surface (polishing surface 352a) of the polishing pad 352 on the polishing table 350. According to the embodiment shown in FIG. 17, the jig 500 and the lower member 306 are larger than the polishing table 350, so that a part of the jig 500 is protruding out of the polishing table 350. An extension table 580 is therefore provided. FIG. 18 is a schematic perspective view of the extension table 580. The extension table 580 is intended to support the portion of the jig 500, which is protruding out of the polishing table 350, at the level of the surface (polishing surface 352a) of the polishing pad 352 on the polishing table 350. In FIG. 18, an outer shape of the polishing table 350 is shown by a broken line. As shown in FIG. 18, the extension table 580 has one end portion disposed on the polishing table 350. The extension table 580 may be provided with a height adjusting mechanism or the like.

Figure 19:
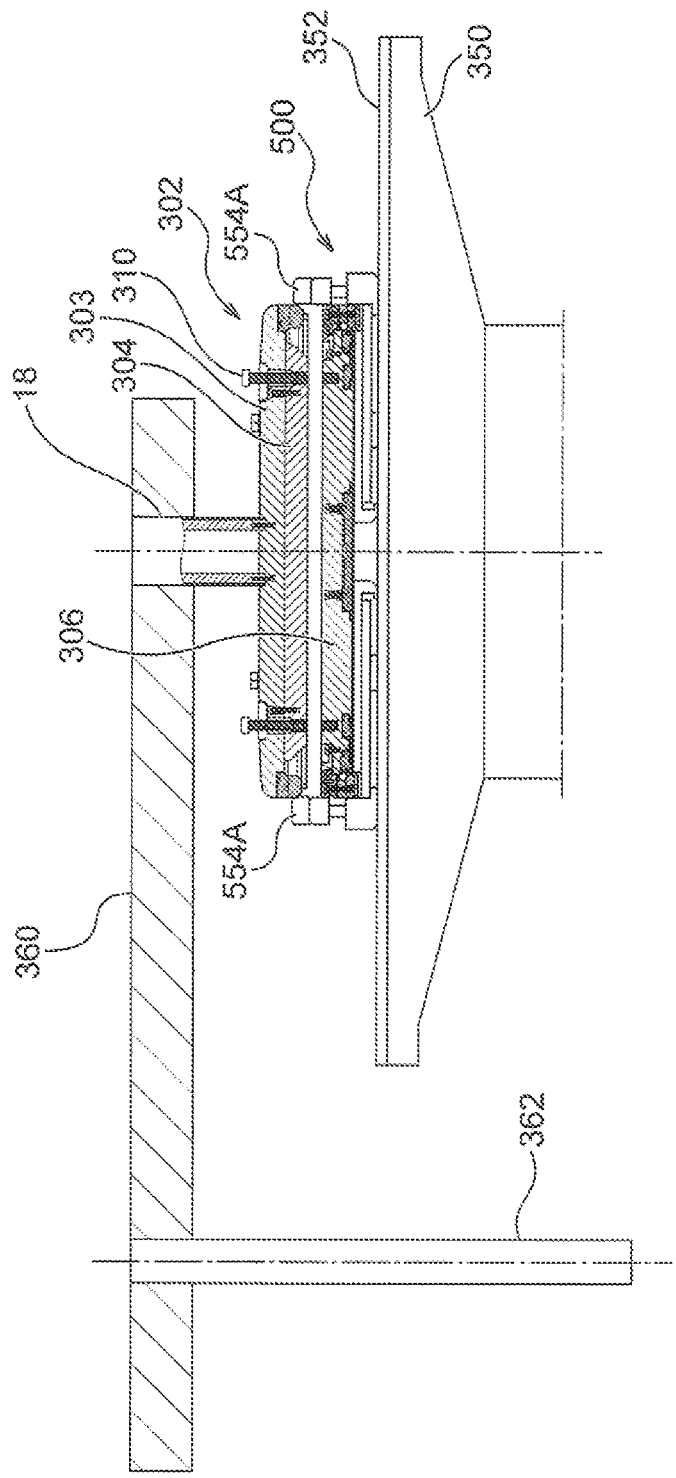
FIG. 19 is a lateral view showing the jig and the top ring as they would appear when the jig holding the lower member is located right under the top ring according to one embodiment.

As shown in FIG. 17, after the jig 500 is placed on the surface (polishing surface 352a) of the polishing pad 352 on the polishing table 350, the jig 500 is moved to right under the top ring 302. FIG. 19 is a lateral view showing the jig 500 and the top ring 302 as they would appear when the jig 500 holding the lower member 306 is located right under the top ring 302. The lower member 306 held on the movable plate 504 can be moved toward the upper member 303 and the intermediate member 304 by feeding the fluid into the pressure chamber 508 of the jig 500 and raising the movable plate 504 in a state shown in FIG. 19.

Figure 20:
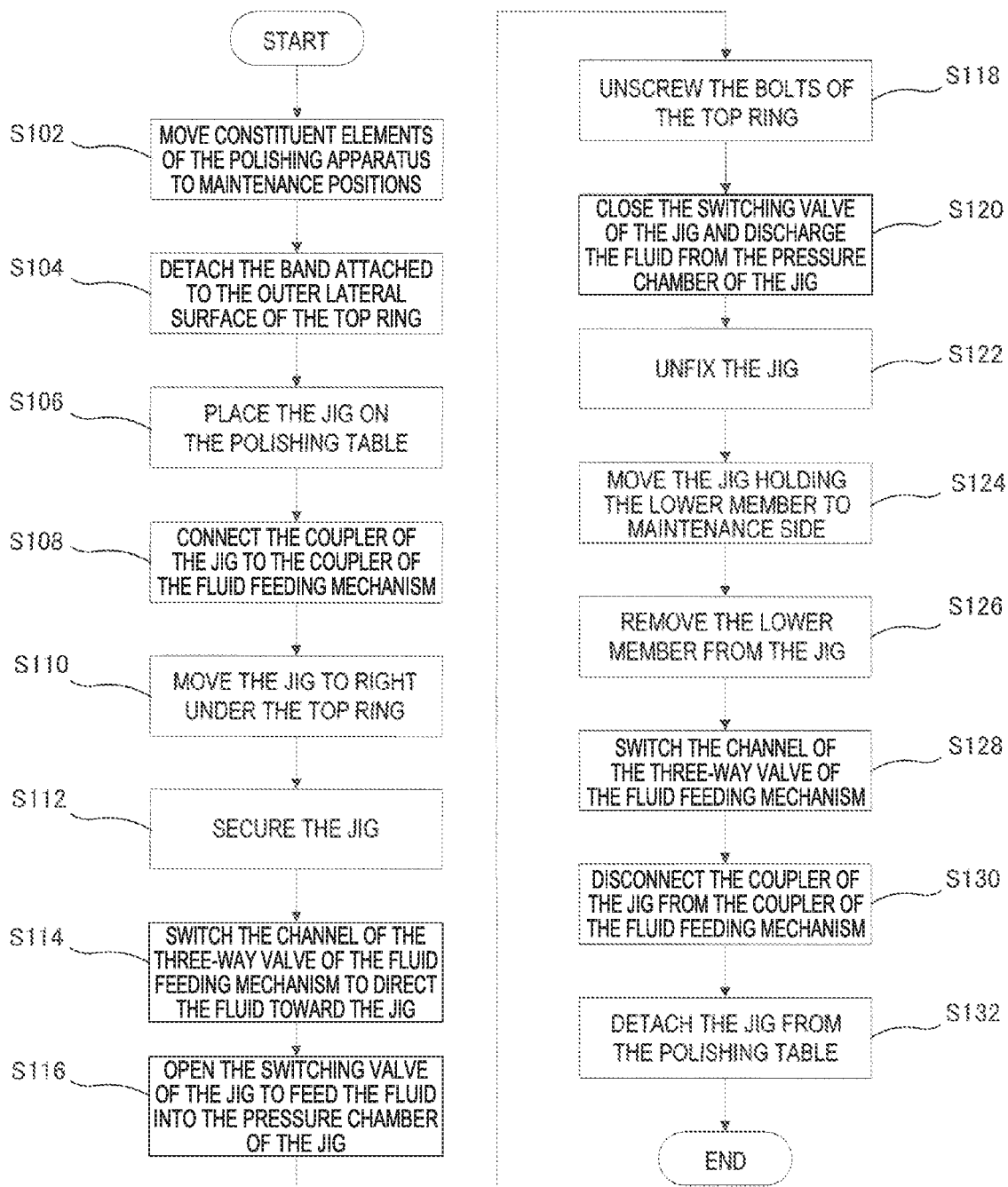
FIG. 20 is a flowchart showing a method of dismounting the lower member from the top ring by using the jig according to one embodiment.

FIG. 20 is a flowchart showing a method of dismounting the lower member 306 from the top ring 302 by using the jig 500 according to one embodiment. As shown in FIG. 20, the constituent elements of the polishing apparatus 300, which include, for example, the top ring 302, the polishing liquid feeding nozzle 354, the atomizer 358, the dresser 356, etc., are first moved to the respective maintenance positions (S102). Secondly, the band 414 (FIGS. 4 and 5) is detached from the top ring 302 (S104). The jig 500 is placed on the surface (polishing surface 352a) of the polishing pad 352 on the polishing table 350 (S106). If necessary, the extension table 580 may be used. The coupler 518 of the jig 500 is connected to the coupler 570 of the fluid feeding mechanism (S108). The jig 500 is moved to right under the top ring 302 (S110). The jig 500 is secured to be prevented from moving (S112). Specifically, the brake pads 556 are pressed against the rollers 552 by turning the brake bolts 558, to thereby secure the rollers 552.

A channel of the three-way valve 568 of the fluid feeding mechanism (FIG. 16) is switched so that the fluid flows from the fluid source 560 through the duct 562 to be guided toward the jig 500 (S114). The switching valve 514 of the jig 500 is opened to feed a pressure-adjusted fluid through the passage 512 into the pressure chamber 508 of the jig 500 (S116). When the pressure chamber 508 is fed with the fluid, the elastic membrane 506 is pushed upwards. This causes the movable plate 504 to move in the upward direction and support the lower member 306 of the top ring 302. In this state, the bolts 310 are loosened, and the lower member 306 is dismounted from the upper member 303 and the intermediate member 304 (S118). The dismounted lower member 306 is supported by the movable plate 504 of the jig 500. The switching valve 514 of the jig 500 is closed to discharge the fluid from the pressure chamber 508 of the jig 500 (S120). The discharge of the fluid from the pressure chamber 508 lowers the elastic membrane 506, which also lowers the movable plate 504. Subsequently, the jig 500 is unfixed (S122). Specifically, the brake pads 556 are separated from the rollers 552 by turning the brake bolts 558 to unfix the rollers 552. The jig 500 holding the lower member 306 is moved on the polishing table 350 to the maintenance side (S124). The lower member 306 is removed from the jig 500 (S126). After the removal of the lower member 306, the elastic membrane 4, the retainer member 3, the support rollers 450 and the like, which are mounted on the lower member 306 can be replaced. After the lower member 306 is removed from the jig 500, the channel of the three-way valve 568 of the fluid feeding mechanism is switched (S128). To be more specific, the three-way valve 568 is switched to release residual pressure existing between the switching valve 514 and the three-way valve 568. The coupler 518 of the jig 500 is disconnected from the coupler 570 of the fluid feeding mechanism (S130). The jig 500 is finally detached from the surface (polishing surface 352a) of the polishing pad 352 on the polishing table 350 (S132).

Figure 21:
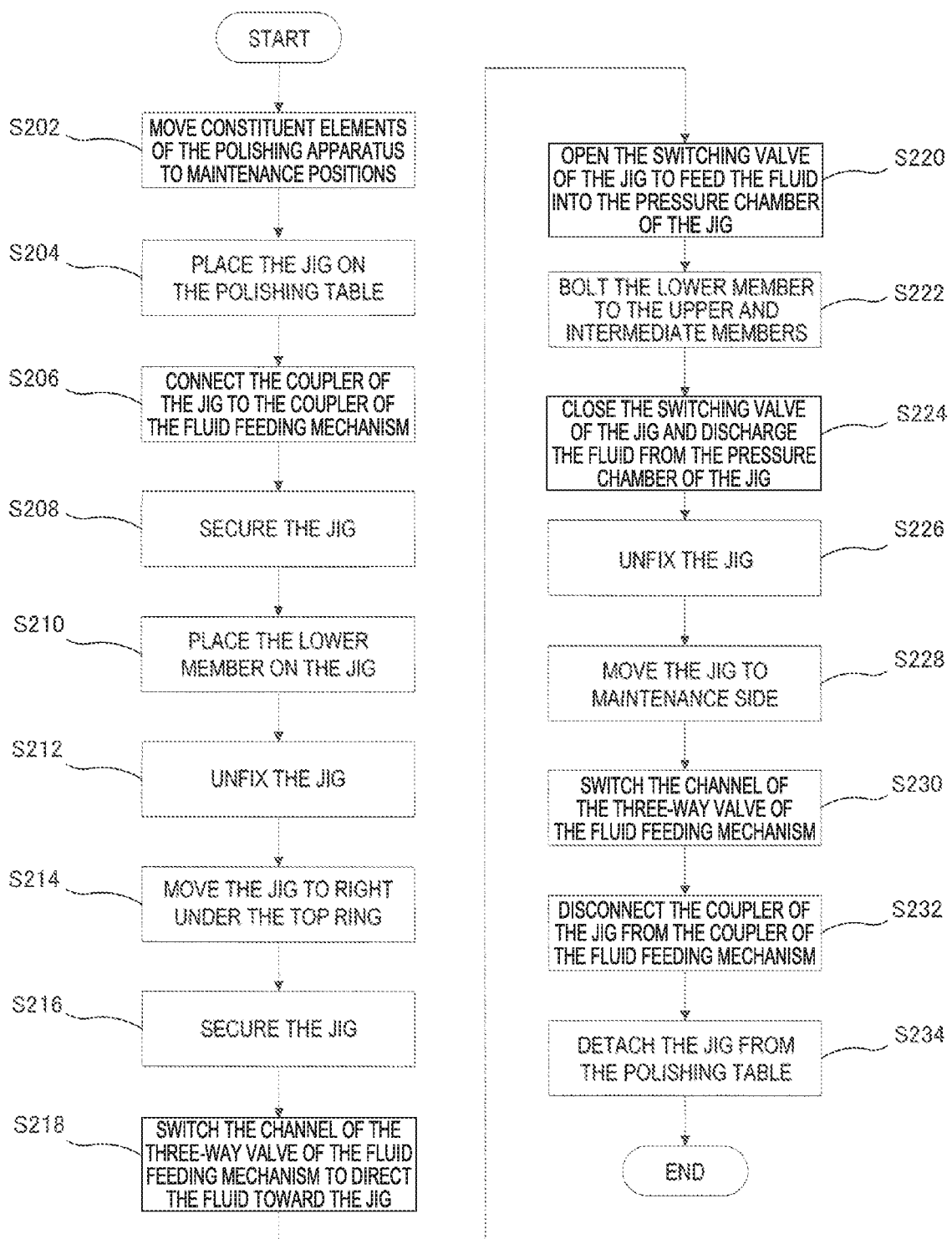
FIG. 21 is a flowchart showing a method of mounting the lower member of the top ring on the upper and intermediate members by using the jig according to one embodiment.

FIG. 21 is a flowchart showing a method of mounting the lower member 306 of the top ring 302 on the upper member 303 and the intermediate member 304 by using the jig 500 according to one embodiment. As shown in FIG. 21, the constituent elements of the polishing apparatus 300, which include, for example, the top ring 302, the polishing liquid feeding nozzle 354, the atomizer 358, the dresser 356 and the like are moved to the respective maintenance positions (S202). The jig 500 is placed on the surface (polishing surface 352a) of the polishing pad 352 on the polishing table 350 (S204). If necessary, the extension table 580 may be used. The coupler 518 of the jig 500 is connected to the coupler 570 of the fluid feeding mechanism (S206). The jig 500 is secured to be prevented from moving (S208). Specifically, the brake pads 556 are pressed against the rollers 552 by turning the brake bolts 558, to thereby secure the rollers 552. The lower member 306 is placed on the movable plate 504 of the jig 500 (S210). The jig 500 is unfixed (S212). Specifically, the brake pads 556 are separated from the rollers 552 by turning the brake bolts 558, to thereby unfix the rollers 552. The jig 500 is moved to right under the top ring 302 (S214). The jig 500 is secured to be prevented from moving (S216). The channel of the three-way valve 568 of the fluid feeding mechanism (FIG. 16) is switched, so that the fluid flows from the fluid source 560 through the duct 562 to be guided toward the jig 500 (S218). The switching valve 514 of the jig 500 is opened so that the pressure-adjusted fluid is fed through the passage 512 into the pressure chamber 508 of the jig 500 (S220). The feeding of the fluid into the pressure chamber 508 pushes the elastic membrane 506 in the upward direction. The movable plate 504 is also moved upwards to push the lower member 306 toward the upper member 303 and the intermediate member 304 of the top ring 302. In this state, the bolts 310 are loosened, and the lower member 306 is fixed to the upper member 303 and the intermediate member 304 (S222). The switching valve 514 of the jig 500 is closed to discharge the fluid from the pressure chamber 508 of the jig 500 (S224). The discharge of the fluid from the pressure chamber 508 lowers the elastic membrane 506, which also lowers the movable plate 504. The jig 500 is unfixed (S226). The jig 500 is moved on the polishing table 350 to the maintenance side (S228). The channel of the three-way valve 568 of the fluid feeding mechanism is switched (S230). To be more specific, the three-way valve 568 is switched to release the residual pressure existing between the switching valve 514 and the three-way valve 568. The coupler 518 of the jig 500 is disconnected from the coupler 570 of the fluid feeding mechanism (S232). The jig 500 is detached from the surface (polishing surface 352a) of the polishing pad 352 on the polishing table 350 (S234).

At least the following technical ideas are understood from the above-discussed embodiments.

Embodiment 1

Embodiment 1 provides a jig for mounting/dismounting at least a part of a top ring for holding a substrate. The jig comprises a movable plate for supporting at least a part of the top ring, which is in a dismounted state, a plurality of posts for positioning the jig at a predetermined position relative to the top ring, the plurality of posts being configured to be engaged with the top ring, and a drive mechanism for moving the movable plate in a direction toward and away from the top ring.

Embodiment 2

The jig as described in Embodiment 1 according to Embodiment 2 further comprises a moving mechanism for moving the jig.

Embodiment 3

The jig as described in Embodiment 1 or 2 according to Embodiment 3 further comprises a stopping mechanism for fixing a position of the jig to prevent the jig from moving.

Embodiment 4

The jig as described in any one of Embodiments 1 to 3 is disposed on a polishing table for supporting a polishing pad.

Embodiment 5

The jig as described in Embodiment 4 according to Embodiment 5 further comprises an extension table including a surface which is level with a surface of the polishing table or a polishing surface of the polishing pad placed on the polishing table, the extension table being mountable on/dismountable from the polishing table. The jig is disposed on the polishing table and the extension table.

Embodiment 6

Embodiment 6 provides a method of dismounting at least a part of a top ring for holding a substrate. The method comprises the steps of setting the jig as described in any one of Embodiments 1 to 5 on a polishing table or a polishing surface of a polishing pad placed on the polishing table, moving the jig to right under the top ring, raising a movable plate of the jig to make the movable plate support the part of the top ring, separating the part of the top ring from a top ring body, and lowering the movable plate.

Embodiment 7

Embodiment 7 provides a method of mounting at least a part of a top ring for holding a substrate onto a top ring body. The method comprises the steps of setting the jig as described in any one of Embodiments 1 to 5 on a polishing table or a polishing surface of a polishing pad placed on the polishing table, placing the part of the top ring on the movable plate of the jig, moving the jig to right under the top ring body, raising the movable plate of the jig to bring the part of the top ring on the movable plate into contact with the top ring body, joining the part of the top ring to the top ring body, and lowering the movable plate.

REFERENCE SIGN LIST

2: top ring body
18: top ring shaft
300: polishing apparatus
302: top ring
303: upper member
304: intermediate member
306: lower member
310: bolt
350: polishing table
352: polishing pad
500: jig
502: base plate
504: movable plate
506: elastic membrane
508: pressure chamber
512: passage
513: cover plate
514: switching valve
516: tube
518: coupler
524: stopper
526: flange
530: guide pin
550: handle
552: roller
554A: post
554B: post
WF: substrate

What is claimed is:

1. A jig for mounting/dismounting at least a part of a top ring for holding a substrate, comprising:
a movable plate for supporting at least a part of the top ring, which is in a dismounted state;
a base plate;
an elastic membrane disposed between the base plate and the movable plate, a pressure chamber is defined between the base plate and the elastic membrane;
a plurality of posts for positioning the jig at a predetermined position relative to the top ring, the plurality of posts being configured to be engaged with the top ring; and
a drive mechanism for moving the movable plate in a direction toward and away from the top ring, the drive mechanism configured to feed fluid into and discharge the fluid from the pressure chamber.

2. The jig according to claim 1, further comprising a moving mechanism for moving the jig.

3. The jig according to claim 1, further comprising a stopping mechanism for fixing a position of the jig to prevent the jig from moving.

4. The jig according to claim 1, wherein the jig is disposed on a polishing table for supporting a polishing pad.

5. The jig according to claim 4, further comprising:
an extension table including a surface which is level with a surface of the polishing table or a polishing surface of the polishing pad placed on the polishing table, the extension table being mountable on and dismountable from the polishing table, wherein
the movable plate, the base plate, the plurality of posts, and the drive mechanism are disposed on the polishing table and the extension table.

6. A method of dismounting at least a part of a top ring for holding a substrate, comprising the steps of:
setting a jig on a polishing table or a polishing surface of a polishing pad placed on the polishing table;
the jig comprising:
a movable plate for supporting at least a part of the top ring, which is in a dismounted state;
a base plate;
an elastic membrane disposed between the base plate and the movable plate, a pressure chamber is defined between the base plate and the elastic membrane;
a plurality of posts for positioning the jig at a predetermined position relative to the top ring, the plurality of posts being configured to be engaged with the top ring; and
a drive mechanism for moving the movable plate in a direction toward and away from the top ring, the drive mechanism configured to feed fluid into and discharge the fluid from the pressure chamber; moving the jig to right under the top ring;
raising a movable plate of the jig to make the movable plate support the part of the top ring;
separating the part of the top ring from a top ring body; and
lowering the movable plate.

7. A method of mounting at least a part of a top ring for holding a substrate onto a top ring body, comprising the steps of:
setting a jig on a polishing table or a polishing surface of a polishing pad placed on the polishing table;
the jig comprising:
a movable plate for supporting at least a part of the top ring, which is in a dismounted state;
a base plate;
an elastic membrane disposed between the base plate and the movable plate, a pressure chamber is defined between the base plate and the elastic membrane;
a plurality of posts for positioning the jig at a predetermined position relative to the top ring, the plurality of posts being configured to be engaged with the top ring; and
a drive mechanism for moving the movable plate in a direction toward and away from the top ring, the drive mechanism configured to feed fluid into and discharge the fluid from the pressure chamber;
placing the part of the top ring on the movable plate of the jig;
moving the jig to right under the top ring body;

raising the movable plate of the jig to bring the part of the top ring on the movable plate into contact with the top ring body;

joining the part of the top ring to the top ring body; and lowering the movable plate.

8. A jig for mounting/dismounting at least a part of a top ring for holding a substrate, comprising:

a movable plate for supporting at least a part of the top ring, which is in a dismounted state;

a plurality of posts for positioning the jig at a predetermined position relative to the top ring, the plurality of posts being configured to be engaged with the top ring; and a drive mechanism for moving the movable plate in a direction toward and away from the top ring, wherein the jig is disposed on a polishing table for supporting a polishing pad, the jig further comprises an extension table including a surface which is level with a surface of the polishing table or a polishing surface of the polishing pad placed on the polishing table, the extension table being mountable on and dismountable from the polishing table, wherein the movable plate, the base plate, the plurality of posts, and the drive mechanism are disposed on the polishing table and the extension table.

9. The jig according to claim 8, further comprising a moving mechanism for moving the jig.

10. The jig according to claim 8, further comprising a stopping mechanism for fixing a position of the jig to prevent the jig from moving.

11. A method of dismounting at least a part of a top ring for holding a substrate, comprising the steps of:

setting a jig on a polishing table or a polishing surface of a polishing pad placed on the polishing table;

the jig comprising:

a movable plate for supporting at least a part of the top ring, which is in a dismounted state;

a plurality of posts for positioning the jig at a predetermined position relative to the top ring, the plurality of posts being configured to be engaged with the top ring; and a drive mechanism for moving the movable plate in a direction toward and away from the top ring;

moving the jig to right under the top ring;

raising a movable plate of the jig to make the movable plate support the part of the top ring;

separating the part of the top ring from a top ring body; and lowering the movable plate.

12. A method of mounting at least a part of a top ring for holding a substrate onto a top ring body, comprising the steps of:

setting a jig on a polishing table or a polishing surface of a polishing pad placed on the polishing table;

the jig comprising:

a movable plate for supporting at least a part of the top ring, which is in a dismounted state;

a plurality of posts for positioning the jig at a predetermined position relative to the top ring, the plurality of posts being configured to be engaged with the top ring; and a drive mechanism for moving the movable plate in a direction toward and away from the top ring;

placing the part of the top ring on the movable plate of the jig;

moving the jig to right under the top ring body;

raising the movable plate of the jig to bring the part of the top ring on the movable plate into contact with the top ring body;

joining the part of the top ring to the top ring body; and lowering the movable plate.

\* \* \* \* \*